(12) United States Patent
Estep et al.

(10) Patent No.: US 11,846,949 B2
(45) Date of Patent: Dec. 19, 2023

(54) SYSTEMS AND METHODS FOR CALIBRATION OF A POSE OF A SENSOR RELATIVE TO A MATERIALS HANDLING VEHICLE

(71) Applicant: Crown Equipment Corporation, New Bremen, OH (US)

(72) Inventors: Ryan Michaels Estep, Auckland (NZ); Timothy William Fanselow, Auckland (NZ); Callum James Robinson, Auckland (NZ)

(73) Assignee: Crown Equipment Corporation, New Bremen, OH (US)

( * ) Notice: Subject to any disclaimer, the term of this patent is extended or adjusted under 35 U.S.C. 154(b) by 741 days.

(21) Appl. No.: 16/789,595

(22) Filed: Feb. 13, 2020

(65) Prior Publication Data
US 2020/0264625 A1    Aug. 20, 2020

Related U.S. Application Data

(60) Provisional application No. 62/807,536, filed on Feb. 19, 2019.

(51) Int. Cl.
*G05D 1/02* (2020.01)
*G06T 7/70* (2017.01)

(52) U.S. Cl.
CPC ............ *G05D 1/0246* (2013.01); *G06T 7/70* (2017.01); *G05D 1/0212* (2013.01); *G06T 2207/30252* (2013.01)

(58) Field of Classification Search
CPC ...... G05D 1/0246; G05D 1/0212; G06T 7/70; G06T 2207/30252
See application file for complete search history.

(56) References Cited

U.S. PATENT DOCUMENTS 9,170,581 B2   10/2015   Bell et al.
9,349,181 B2   5/2016   Chandrasekar et al.
(Continued)

FOREIGN PATENT DOCUMENTS

WO   2019191288 A1   3/2019

OTHER PUBLICATIONS

International Search Report and Written Opinion dated Apr. 22, 2020 relating to International Application No. PCT/US2020/018081.
(Continued)

*Primary Examiner* — Ig T An
(74) *Attorney, Agent, or Firm* — Dinsmore & Shohl LLP

(57) ABSTRACT

Methods and systems for a materials handling vehicle comprising a processor and a sensor to record warehouse features. The processor is configured to generate and extract features from sensor data, create a factor graph (FG) including a sensor extrinsics node (e0), and generate an initial vehicle node (v0), initial sensor frame node (c0), and initial sensor feature node (f0) that comprises a selected extracted feature associated with c0 and v0 in an initial data association. A subsequent vehicle node (v1) is generated based on an accumulated odometry amount, and a subsequent sensor frame node (c1) is generated and associated with e0, v1, and one of f0 or a subsequent sensor feature node (f1) in a subsequent data association. The FG is optimized to provide a sensor calibration output based on the data associations, and the vehicle is navigated based on the sensor calibration output.

20 Claims, 14 Drawing Sheets

(56) References Cited

U.S. PATENT DOCUMENTS

| | | |
|---|---|---|
| 9,606,540 B2 | 3/2017 | Bell et al. |
| 9,921,067 B2 | 3/2018 | Fanselow et al. |
| 9,984,467 B2 | 5/2018 | Chandrasekar et al. |
| 2012/0303255 A1 | 11/2012 | Wong et al. |
| 2012/0323432 A1 | 12/2012 | Wong et al. |
| 2016/0209846 A1 | 7/2016 | Eustice et al. |
| 2016/0349061 A1* | 12/2016 | Fanselow ............... G05D 1/021 |
| 2016/0353099 A1* | 12/2016 | Thomson ............. G06V 30/422 |
| 2017/0269608 A1 | 9/2017 | Chandrasekar et al. |
| 2018/0126984 A1 | 5/2018 | Liu et al. |
| 2018/0307941 A1* | 10/2018 | Holz .................... G01C 21/206 |
| 2019/0235083 A1* | 8/2019 | Zhang ................... G01S 7/4808 |

OTHER PUBLICATIONS

Carlone, Luca et al., "Eliminating Conditionally Independent Sets in Factor Graphs: A Unifying Perspective based on Smart Factors" https://ieeexplore.ieee.org/abstract/document/6907483.

\* cited by examiner

SYSTEMS AND METHODS FOR CALIBRATION OF A POSE OF A SENSOR RELATIVE TO A MATERIALS HANDLING VEHICLE

CROSS-REFERENCE TO RELATED APPLICATIONS

The present disclosure claims priority to U.S. Provisional Application No. 62/807,536, entitled "SYSTEMS AND METHODS FOR CALIBRATION OF A POSE OF A SENSOR RELATIVE TO A MATERIALS HANDLING VEHICLE," filed Feb. 19, 2019, the entirety of which is incorporated by reference herein.

TECHNICAL FIELD

Embodiments described herein generally relate to a materials handling vehicle sensor calibration and, more specifically, to systems and methods for calibrating a sensor of a materials handling vehicle relative to the materials handling vehicle, in a warehouse environment.

BACKGROUND

Materials handling vehicles may utilize one or more sensors to capture features in a warehouse environment to facilitate localization, pose determination, and navigation. However, operational challenges can be introduced if the sensor is not properly calibrated. Manufacturing or installation tolerances for a sensor's roll, pitch, yaw, x, y, and/or z position relative to a materials handling vehicle may include too much variation to reliably localize the materials handling vehicle in the warehouse environment. As such, a need in the industry exists for accurate calibration of sensors on materials handling vehicles regardless of location, such as not limited to a factory at which the materials handling vehicle was built.

BRIEF SUMMARY

According to the subject matter of the present disclosure, in a first aspect, a materials handling vehicle comprises a sensor, a vehicle position processor, one or more vehicle dead reckoning components, and a drive mechanism configured to move the materials handling vehicle along an inventory transit surface. The sensor is configured to record one or more features of a warehouse. The vehicle position processor is configured to generate sensor data from a recordation of one or more features, as recorded by the sensor, extract the one or more features from the sensor data, create a factor graph including a sensor extrinsics node (e0) comprising initial seed extrinsics associated with the sensor, and generate, in the factor graph, an initial vehicle node (v0), an initial sensor frame node (c0), and an initial sensor feature node (f0). The initial sensor feature node (f0) comprises a selected one of the one or more extracted features associated with the initial sensor frame node (c0) and the initial vehicle node (v0) in an initial data association. The vehicle position processor is further configured to navigate the materials handling vehicle using the drive mechanism along the inventory transit surface, generate, in the factor graph, a subsequent vehicle node (v1) based on an accumulated odometry amount from the one or more vehicle dead reckoning components, and generate, in the factor graph, a subsequent sensor frame node (c1) associated with the sensor extrinsics node (e0), the subsequent vehicle node (v1), and one of the initial sensor feature node (f0) or a subsequent sensor feature node (f1) in a subsequent data association. The vehicle position processor is further configured to optimize the factor graph to provide a calibration output associated with the sensor based on the initial data association and the subsequent data association, and navigate the materials handling vehicle along the inventory transit surface based on the calibration output associated with the sensor.

In a second aspect, comprising the materials handling vehicle of the first aspect, the vehicle position processor is further configured to generate, in the factor graph, the initial vehicle node (v0) as (i) a map-based initial vehicle node at a vehicle seed position with (ii) an associated vehicle prior factor and (iii) one or more mapped features from a site map as corresponding sensor feature nodes along with (iv) corresponding mapped feature prior factors when the vehicle seed position and a feature map comprising the one or more mapped features are provided.

In a third aspect, comprising the materials handling vehicle of the second aspect, the associated vehicle prior factor for the map-based initial vehicle node at the vehicle seed position comprises an error function with respect to an accuracy of the vehicle seed position of the materials handling vehicle with respect to the site map.

In a fourth aspect, comprising the materials handling vehicle of the first aspect, the vehicle position processor is further configured to generate, in the factor graph, the initial vehicle node (v0) as a mapless initial vehicle node at an origin when a vehicle seed position and a feature map are not provided.

In a fifth aspect, comprising the materials handling vehicle of any of the first aspect to the fourth aspect, the vehicle position processor is further configured to iteratively generate, in the factor graph, one or more subsequent sensor feature nodes and one or more further subsequent vehicle nodes based on the accumulated odometry amount from the one or more vehicle dead reckoning components between a preceding vehicle node and a directly subsequent vehicle node, and iteratively generate, in the factor graph, one or more further subsequent sensor frame nodes associated with the sensor extrinsics node (e0), the associated directly subsequent vehicle node, and an associated sensor feature node of the one or more subsequent feature nodes in the subsequent data association.

In a sixth aspect, comprising the materials handling vehicle of the fifth aspect, the vehicle position processor is further configured to generate, in the factor graph, a vehicle between factor between the directly subsequent vehicle node and the preceding vehicle node based on the accumulated odometry amount.

In a seventh aspect, comprising the materials handling vehicle of any of the first aspect to the sixth aspect, the vehicle position processor is further configured to select one feature of the one or more extracted features, associate the one feature with an existing feature as a matched sensor feature node when the one feature and the existing feature match, and generate, in the factor graph, a factor to link a generated sensor frame node with the matched feature node.

In an eighth aspect, comprising the materials handling vehicle of the seventh aspect, the generated sensor frame node comprises one of the initial sensor frame node (c0) or the subsequent sensor frame node (c1).

In a ninth aspect, comprising the materials handling vehicle of the seventh aspect or the eighth aspect, the matched sensor feature node comprises one of the initial sensor feature node (f0) or the subsequent sensor feature node (f1).

In a tenth aspect, comprising the materials handling vehicle of any of the first aspect to the ninth aspect, the vehicle position processor is further configured to select one feature of the one or more extracted features, generate, in the factor graph, a new sensor feature node associated with the one feature when the one feature and an existing feature do not match, and generate, in the factor graph, a factor to link a generated sensor frame node with the new sensor feature node.

In an eleventh aspect, comprising the materials handling vehicle of the tenth aspect, the new sensor feature node comprises one of the initial sensor feature node (f0) or the subsequent sensor feature node (f1).

In a twelfth aspect, comprising the materials handling vehicle of any of the first aspect to the eleventh aspect, the vehicle position processor is further configured to optimize the factor graph when no further features of the one or more extracted features remain to associate with existing features as corresponding matched sensor feature nodes or add to the factor graph as corresponding new sensor feature nodes.

In a thirteenth aspect, comprising the materials handling vehicle of any of the first aspect to the twelfth aspect, the vehicle position processor is further configured to optimize the factor graph by generation of a constrained optimization problem based on one or more factors and one or more variables defined in the factor graph.

In a fourteenth aspect, comprising the materials handling vehicle of the thirteenth aspect, the one or more variables are representative of unknown random variables in the constrained optimization problem and comprise one or more nodes, the one or more nodes comprising one or more of the sensor extrinsics node (e0), the initial vehicle node (v0), the subsequent vehicle node (v1), the initial sensor frame node (c0), the subsequent sensor frame node (c1), the initial sensor feature node (f0), and the subsequent sensor feature node (f1).

In a fifteenth aspect, comprising the materials handling vehicle of the thirteenth aspect or the fourteenth aspect, the one or more factors are representative of probabilistic information with respect to select factors of the one or more factors and comprise a prior factor, a between factor, a reference frame factor, a projection factor, a bearing-range factor, or combinations thereof.

In a sixteenth aspect, comprising the materials handling vehicle of any of the thirteenth aspect to the fifteenth aspect, the constrained optimization problem is constructed using one or more smoothing and mapping (SAM) libraries and optimizers.

In a seventeenth aspect, comprising the materials handling vehicle of any of the thirteenth aspect to the sixteenth aspect, the one or more features comprise one or more overhead lights of the warehouse, and the constrained optimization problem is constructed using an image recognition algorithm, a data association algorithm, a modeling technique, or combinations thereof.

In an eighteenth aspect, comprising the materials handling vehicle of any of the first aspect to the seventeenth aspect, the vehicle position processor is further configured to terminate the optimization upon a determination of an intrinsic factor graph status over a period of time as acceptable based on a predetermined threshold.

In a nineteenth aspect, comprising the materials handling vehicle of any of the first aspect to the eighteenth aspect, the sensor is a camera, a laser-based sensor, or combinations thereof, the camera is configured to capture the one or more features of the warehouse, the laser-based sensor is configured to detect the one or more features of the warehouse, and the vehicle position processor further configured to generate the sensor data from the recordation of the one or more features, as captured by the camera, detected by the laser-based sensor, or combinations thereof.

In accordance with another embodiment of the present disclosure, and in a twentieth aspect, a method of operating the materials handling vehicle of any of the first aspect to the nineteenth aspect comprises, via the vehicle position processor, generating sensor data from a recordation of one or more features, as recorded by the sensor; extracting the one or more features from the sensor data; creating a factor graph including a sensor extrinsics node (e0) comprising initial seed extrinsics associated with the sensor; and generating, in the factor graph, an initial vehicle node (v0), an initial sensor frame node (c0), and an initial sensor feature node (f0). The method further comprises navigating the materials handling vehicle using the drive mechanism along the inventory transit surface; generating, in the factor graph, a subsequent vehicle node (v1) based on an accumulated odometry amount from the one or more vehicle dead reckoning components; and generating, in the factor graph, a subsequent sensor frame node (c1) associated with the sensor extrinsics node (e0), the subsequent vehicle node (v1), and one of the initial sensor feature node (f0) or a subsequent sensor feature node (f1) in a subsequent data association. The method further comprises optimizing the factor graph to provide a calibration output associated with the sensor based on the initial data association and the subsequent data association, and navigating the materials handling vehicle along the inventory transit surface based on the calibration output associated with the sensor.

Although the concepts of the present disclosure are described herein with primary reference to materials handling vehicles in a warehouse environment, it is contemplated that the concepts will enjoy applicability to any automatic, partially automatic, or manual vehicles in an environment.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Figure 1:
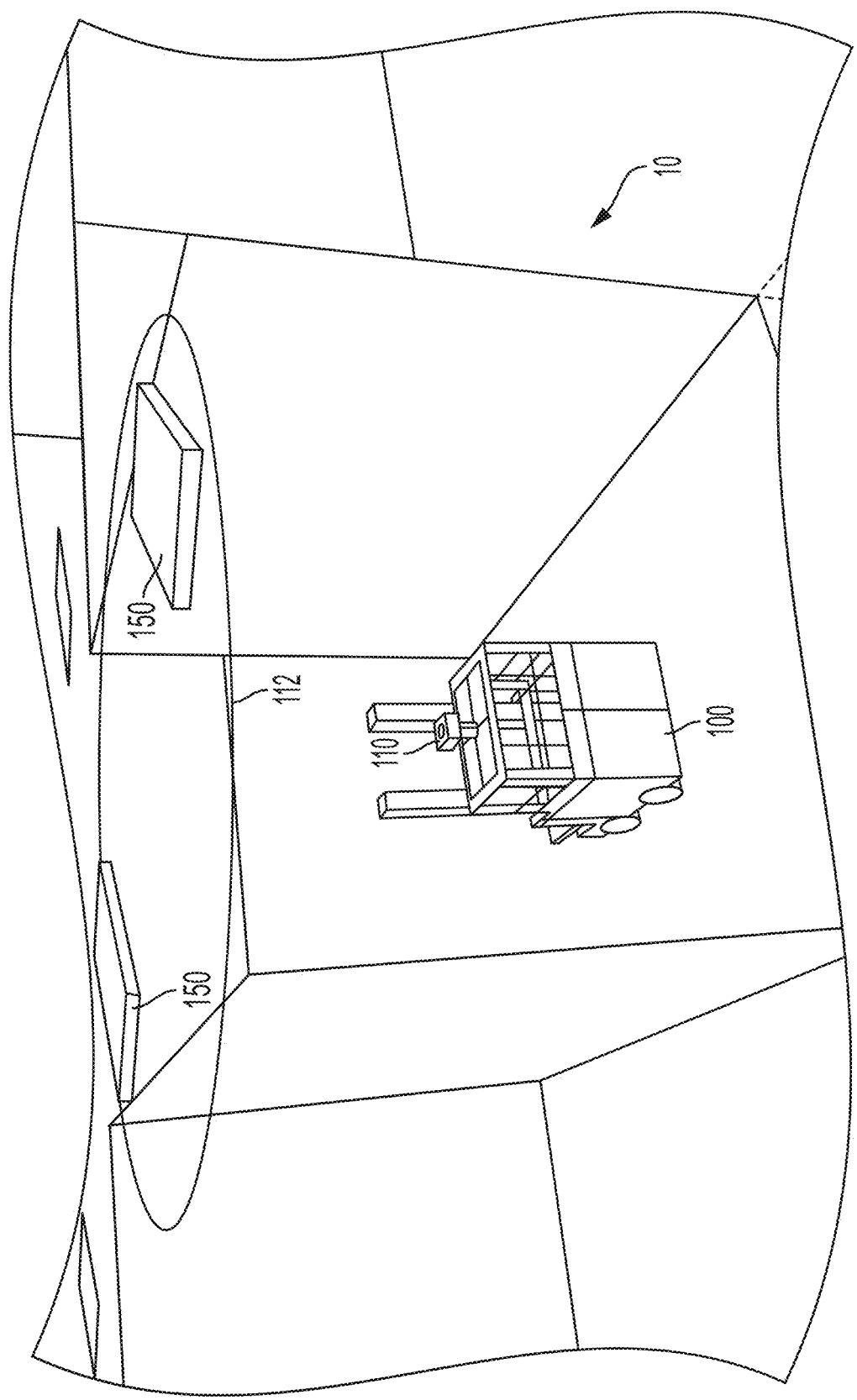
FIG. 1 depicts a materials handling vehicle in a warehouse environment including overhead features, according to one or more embodiments shown and described herein.

Embodiments disclosed herein include systems and methods for calibration of a sensor with respect to a materials handling vehicle. Some embodiments are related to calibration of an image-based sensor such as an image capture device (e.g., a camera) disposed on the materials handling vehicle. Materials handling vehicles may be localized within a warehouse environment by tracking multiple static features in the environment, which may include static features tracked by using one or more sensors such as a camera capturing image data. Such features may be overhead features and/or other static infrastructure. Overhead features may include, for example, skylights, ceiling lights, reflectors, and/or other suitable overhead components for capture or detection. Static infrastructure may include such features, whether overhead or not, and may include, for example, rack-legs and/or readable tags. Other positioning and localization sensor systems, for example, laser-based sensors such as LIDAR, and/or other sensor systems such as RADAR, ultrasonic sensor systems or the like disposed on materials handling vehicles may also be calibrated using the systems and methods described herein. For the purposes of defining and describing the concepts and scope of the present disclosure, it is noted that a "warehouse" encompasses any indoor or otherwise covered facility in which materials handling vehicles transport goods including, but not limited to, warehouses intended primarily for the storage of goods, such as those where single or multi-level warehouse racks or storage units are arranged in aisles or otherwise, and manufacturing facilities where goods are transported about the facility by materials handling vehicles for use in one or more manufacturing processes.

More specifically, embodiments described herein may be configured to reduce the manufacturing tolerances on a sensor coupled on a materials handling vehicle such that the calibrated sensor may localize the materials handling vehicle with an increased degree of accuracy in an environment as compared to a sensor installed but not calibrated with respect to the materials handling vehicle. Through the systems and methods of calibrating the sensor, the sensor may be calibrated with respect to the sensor position on and relative to a particular materials handling vehicle. For example, the sensor's roll, pitch, and yaw relative to the materials handling vehicle may be more accurately determined as compared to initial manufacturing tolerances of the sensor to more accurately determine vehicle pose based on use of the sensor in the warehouse environment. Furthermore, the systems and methods for calibration of the sensor as described herein may be readily employed in a near-real-time process upon delivery and setup of a materials handling vehicle in the environment, for maintenance, when undergoing a component replacement, when retrofitting an existing truck, when settling sensors (e.g., to account for the change in sensor extrinsics over a long period of time), after a period of time (e.g., to adjust for sensor drift), or the like. In some embodiments, deployment and calibration of the localization sensor of a materials handling vehicle may or may not implement a site map of the environment.

The term "localization" is utilized herein to refer to any of a variety of system configurations that enable location tracking of a materials handling vehicle in a warehouse environment. The concepts of the present disclosure are not limited to any particular localization system configuration. A system that implements one or more localization sensors may be applicable to any of a variety of conventional and yet-to-be developed localization systems. Such localization systems may include those described in U.S. Pat. No. 9,349,181 issued on May 24, 2016, entitled LOST VEHICLE RECOVERY UTILIZING ASSOCIATED FEATURE PAIRS, U.S. Pat. No. 9,984,467 issued May 29, 2018, entitled VEHICLE POSITIONING OR NAVIGATION UTILIZING ASSOCIATED FEATURE PAIRS, and/or U.S. Published Patent Application No. 2012/0303255 published Nov. 29, 2012, entitled METHOD AND APPARATUS FOR PROVIDING ACCURATE LOCALIZATION FOR AN INDUSTRIAL VEHICLE. Further, such localization systems may utilize sensors such as image capture devices to determine a pose of a materials handling vehicle in a warehouse environment through use of image capture of overhead features, as described in the above-referenced localization system patents. Such sensors may be calibrated to provide more accurate localization determinations by localization systems. An example of such a calibration technique involving the comparison of image data with a stored site map of a warehouse environment to determine a calibrated value for an image capture device is described in U.S. Patent Publication No. 2016/0353099, assigned to Crown Equipment Corporation. The concepts described herein provide a calibration technique for a localization sensor on a materials handling vehicle that may be calibrated independent of reference to a stored site map of the warehouse environment. As a result, calibration may be simplified and universally implemented in environments regardless of whether a site map has been created for the warehouse environment.

The localization sensors operating with such localization systems may be used to localize and/or navigate a materials handling vehicle through a warehouse environment, such as a warehouse, stockyard, or the like. In some embodiments, an image-based sensor (e.g., camera) and/or laser-based sensor system can be mounted to a materials handling vehicle (e.g., automated guided vehicle or a manually guided vehicle as a materials handling vehicle) that navigates through a warehouse and can assist with vehicle localization. The laser-based sensor system may include a laser scanner, a laser rangefinder, a 2D/3D mapping laser, a LIDAR, or combinations thereof.

In some embodiments, the calibration of an image-based sensor (e.g., a camera) may be useful for materials handling vehicles that utilize overhead feature detection for location determination of the materials handling vehicle and/or routing. Camera calibration parameters may include calibration of roll, pitch, yaw, x position, y position, z position, focal length, other camera extrinsic parameters, intrinsic parameters and/or the like. Camera calibration may include intrinsic calibration and extrinsic calibration. Intrinsic calibration includes determining the parameters of the camera model itself within a suitable range of error. Extrinsic camera calibration may include determining the position of the camera on the materials handling vehicle within a suitable range of error. Embodiments described herein focus on at least extrinsic calibration of the camera. The systems and methods for vehicle calibration incorporating the same will be described in more detail below.

Referring now to FIG. 1, a materials handling vehicle 100 is illustrated that includes materials handling hardware configured to utilize overhead features such as lighting for location and navigation services, according to embodiments described herein. The overhead features may include various styles, types, shapes and sizes of light fixtures, skylights, or the like. As illustrated, a materials handling vehicle 100 may be configured to navigate through a warehouse environment 10, such as a warehouse. The materials handling vehicle 100 may be configured as a materials handling vehicle for lifting and moving goods. Examples of a materials handling vehicle include, but are not limited to, a forklift truck, a reach truck, a turret truck, a walkie stacker truck, a tow tractor, a pallet truck, a high/low, a stacker-truck, trailer loader, a sideloader, a fork hoist, or the like. The materials handling vehicle 100 may be configured to automatically navigate and/or be manually/remotely operated about a floor of the warehouse environment 10 along a desired route. Accordingly, the materials handling vehicle 100 can be directed forwards and backwards by rotation of one or more wheels. Additionally, the materials handling vehicle 100 may change direction by steering the one or more wheels. The materials handling vehicle 100 may be autonomously controlled and/or include operator controls for controlling functions of the materials handling vehicle 100 such as, but not limited to, the speed of the wheels, the orientation of the wheels, and/or the like.

The operator controls may include inputs and outputs that are assigned to functions of the materials handling vehicle 100 such as, for example, switches, buttons, levers, handles, pedals, calibration indicators, and/or the like. The operator controls may additionally include a positioning system, localization system, an accelerator, a brake, an autonomous mode option, and/or other controls, outputs, hardware, and software for operating the materials handling vehicle 100 manually, semi-autonomously, and/or fully-autonomously. The operator controls may additionally include an odometer for determining a distance that the materials handling vehicle 100 travels. The odometer may be configured to determine a determined number of rotations of one or more of the wheels (e.g., utilizing one or more motion sensors 114 (FIG. 2) such as an encoder coupled to the drive shaft or one or more of the wheels) and calculate a distance traveled, based on a predetermined circumference of the wheels. In some embodiments, odometry may be determined based on one or more inertial measurement units (IMU), laser scan matching, and/or visual odometry to calculate a distance traveled.

Figure 2:
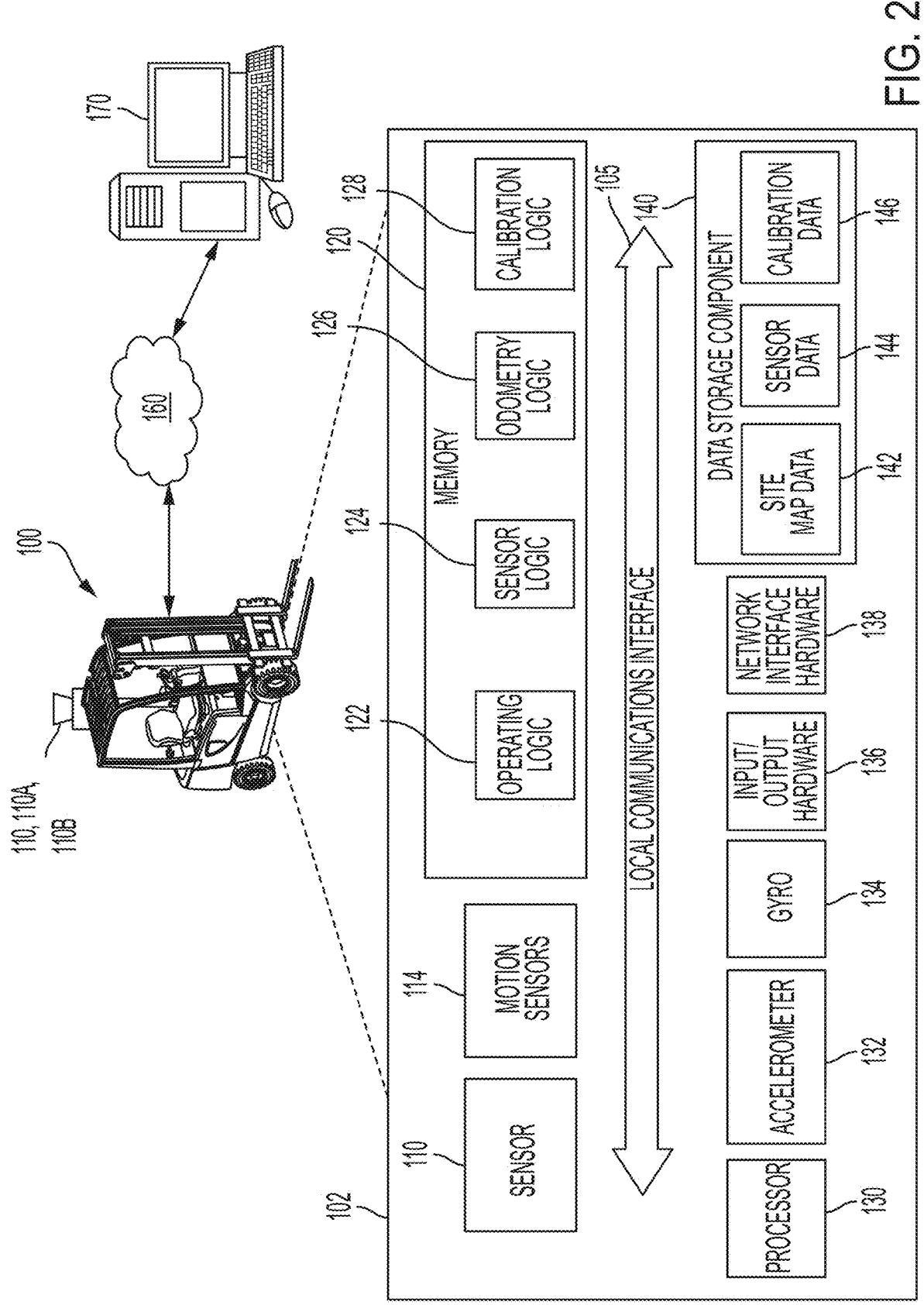
FIG. 2 depicts a computing infrastructure that may be utilized for a materials handling vehicle, according to one or more embodiments shown and described herein.

The materials handling vehicle 100 may also include a sensor 110 disposed on and relative to the materials handling vehicle 100, whereby the sensor 110 may be an image-based sensor such as a camera 110A. FIG. 2 depicts a computing infrastructure that may be implemented and utilized for a materials handling vehicle 100, which computing infrastructure is configured to calibrate the sensor 110 as described in greater detail further below. The sensor 110 may additionally or alternatively be other sensor types configured to aid with vehicle localization, such as a laser-based sensor 110B as described in greater detail below.

As a non-limiting example described with respect to FIGS. 1-4, the sensor 110 may be an image-based sensor such as a camera. With respect to such an image-based sensor embodiment, the sensor 110 may be a digital still camera, a digital video camera, an analog still camera, an analog video camera, a red-green-blue (RGB) camera, a RGB-depth (RBGD) camera, and/or other device for capturing an overhead image. The captured image may be formatted as a JPEG, JPEG 2000, Exif, TIFF, raw image formats, GIF, BMP, PNG, Netpbm format, WEBP, raster formats, vector formats, and/or other type of format. Accordingly, the sensor 110 may include an image sensor as an image capture device such as a charge coupled device (CCD), complementary metal-oxide-semiconductor sensor, or functional equivalents thereof. In some embodiments, the materials handling vehicle 100 can be located within the warehouse environment 10 and be configured to capture overhead images of the ceiling of the warehouse environment 10. In order to capture overhead images, the sensor 110 can be mounted to the materials handling vehicle 100 and focused toward the ceiling. The sensor 110 may capture sensor data 144 (e.g., image data) of the ceiling and/or the warehouse environment 10 within an image area 112 (e.g., the field of view of a camera such as the image areas 112A-112L of FIG. 3), which may be based on camera specifications and the installation position on the materials handling vehicle 100. For example, the image area 112 is depicted with reference to sensor 110 focused on the ceiling of the warehouse environment 10 which includes features 150 such as ceiling lights 150A-150S of FIG. 3.

Figure 4:
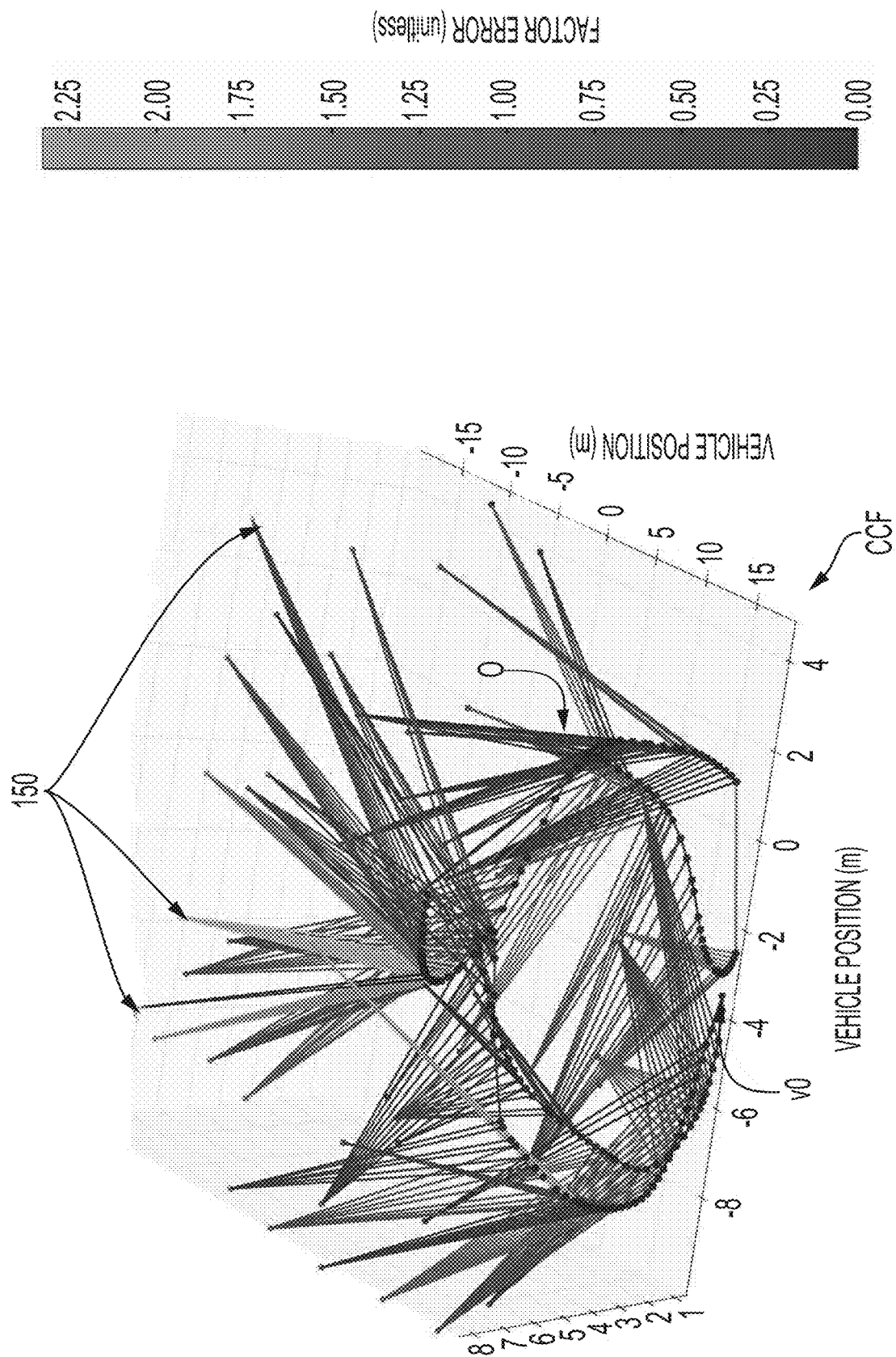
FIG. 4 depicts a graphical representation of a calibration path executed by a materials handling vehicle within a calibration coordinate frame, according to one or more embodiments shown and described herein.

The ceiling of the warehouse environment 10 may include overhead lights such as, but not limited to, ceiling lights 150A-S for providing illumination from the ceiling or generally from above a materials handling vehicle 100 operating in the warehouse. The ceiling lights 150A-S may include skylights, fluorescent lights, industrial lighting fixtures and/or other types of lights of various shapes and sizes; and may be mounted in or suspended from the ceiling or wall structures to provide illumination. FIG. 4 depicts an embodiment of a plurality of positions of the materials handling vehicle 100 in a coordinate reference frame and the position of the ceiling lights 150A-S within a coordinate reference frame as determined through at least one or more mapless calibration process as described herein and in greater detail further below.

The systems and methods described herein may further employ one of a variety of image recognition, data association, and modeling techniques to construct an optimization problem. In some data association embodiments, tracking of static overhead features such as a ceiling light between frames may be accomplished using the pixel velocity nearest neighbor image space tracking algorithm, or any algorithm that is capable to track a feature from frame to frame without prior knowledge of the feature's position in the camera calibration frame. Moreover, image recognition embodiments may include edge detection, feature detection, and/or object recognition routines for tracking a static feature or a portion of the static overhead feature from frame to frame. Additionally, modeling techniques may include techniques such as structure from motion (SFM), simultaneous localization and mapping (SLAM), Georgia Technology smoothing and mapping (GTSAM) libraries, or other smoothing and mapping (SAM) libraries may be implemented using factor graphs and/or Bayes networks as the underlying paradigm. It is to be understood that other modeling techniques are contemplated within the scope of this disclosure.

Specifically, the optimization problem may be constructed utilizing a library, such as the GTSAM library of C++ classes or other smoothing and mapping (SAM) libraries. The GTSAM library implements smoothing and mapping in robotics and vision, using factor graphs (FG) motivated from Bayes networks as the underlying computing paradigm.

The SAM library and other similar libraries, provide a general purpose framework for constructing optimization problems related to satisfying multiple spatial constraints with various associated uncertainties. It is contemplated that portions of the library targeting SLAM may also be utilized. The SLAM portion of the SAM library specifically provides functionality for optimizing sensor extrinsic calibration using reference frame factors.

Figure 5A:
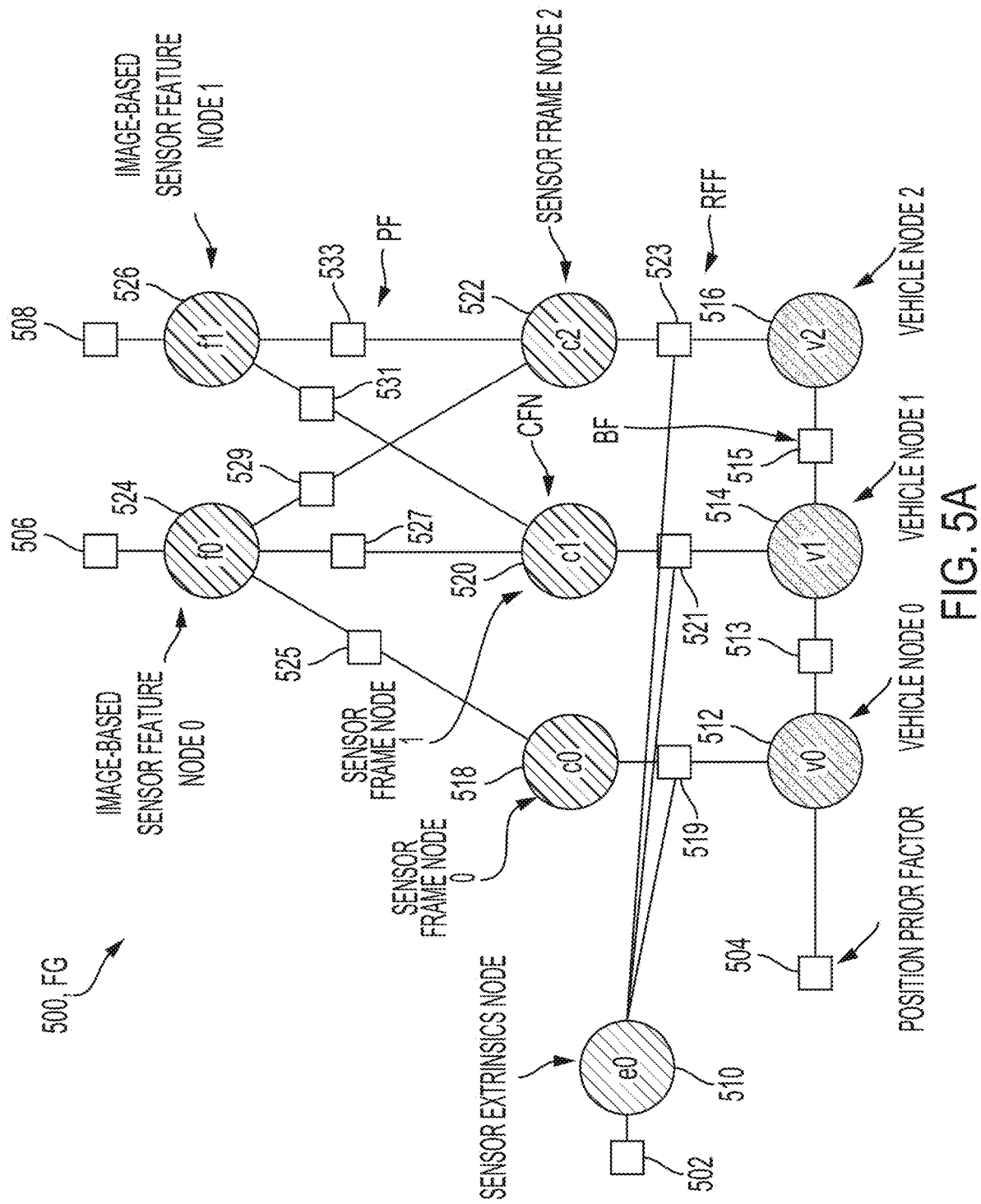
FIG. 5A schematically depicts a factor graph for a mapped sensor calibration of an image-based sensor of a materials handling vehicle, according to one or more embodiments shown and described herein.
Figure 5B:
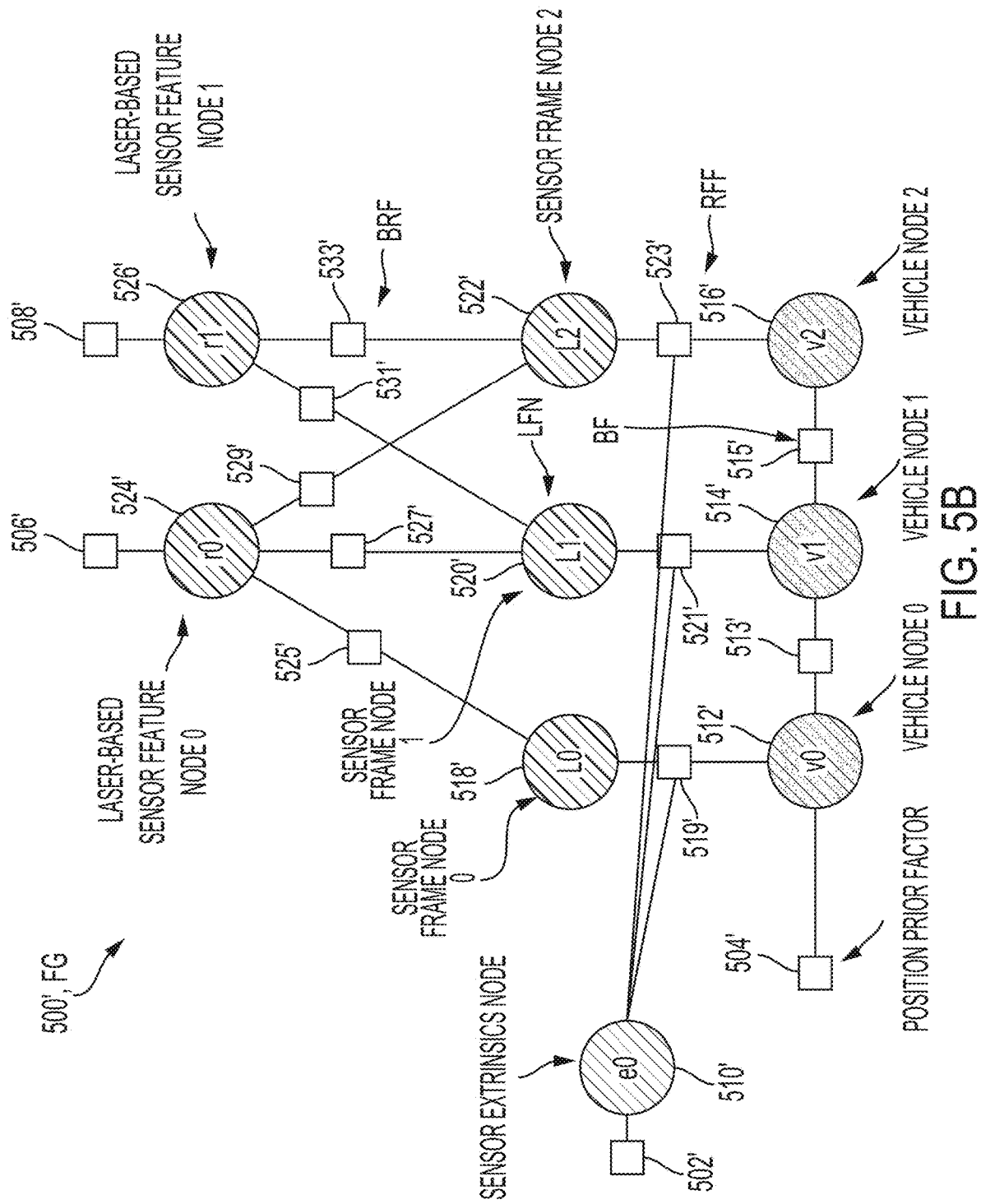
FIG. 5B schematically depicts a factor graph for a mapped sensor calibration of a laser-based sensor of a materials handling vehicle, according to one or more embodiments shown and described herein.
Figure 6:
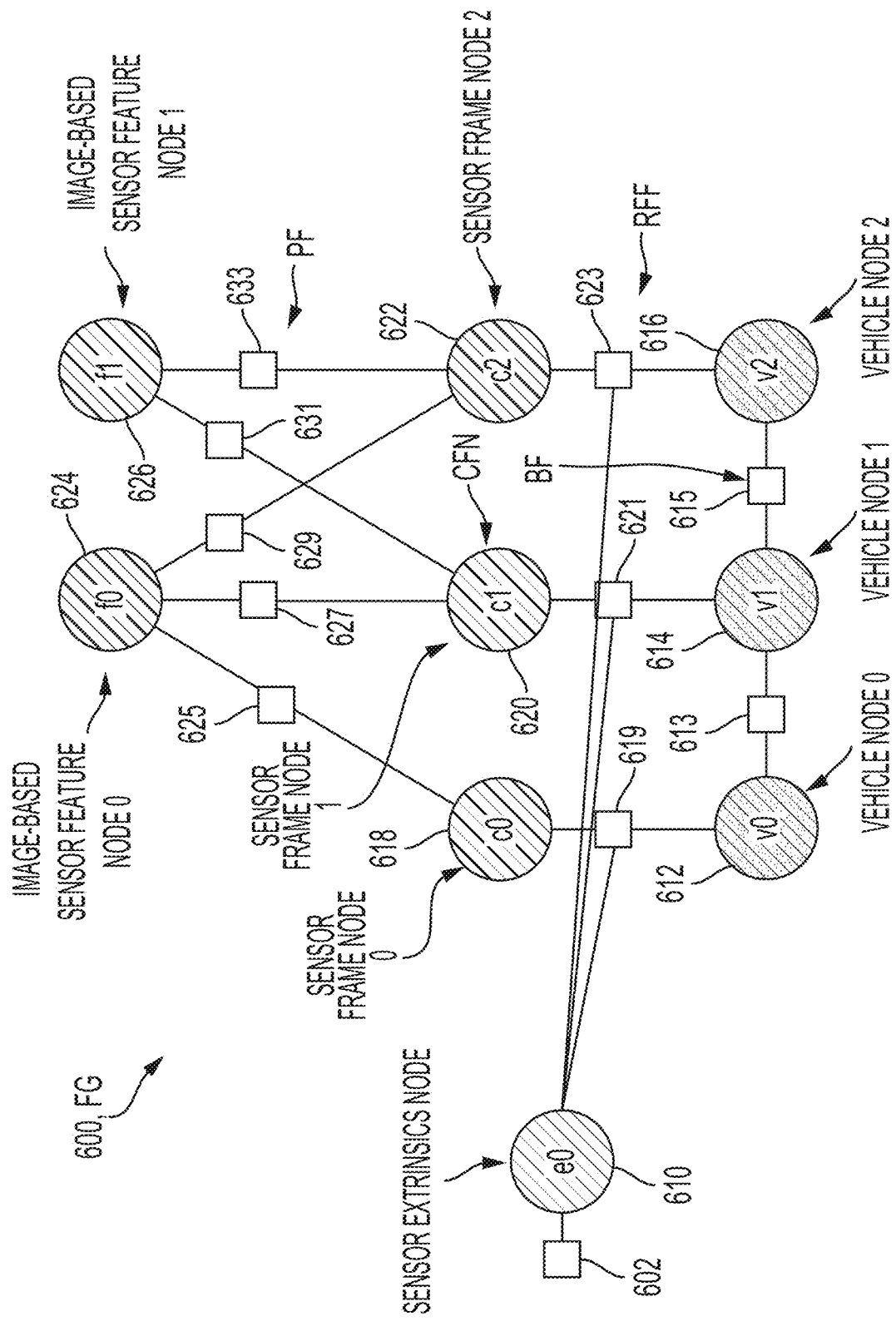
FIG. 6 schematically depicts a factor graph for a mapless sensor calibration of an image-based sensor of a materials handling vehicle in an environment, according to one or more embodiments shown and described herein.
Figure 7:
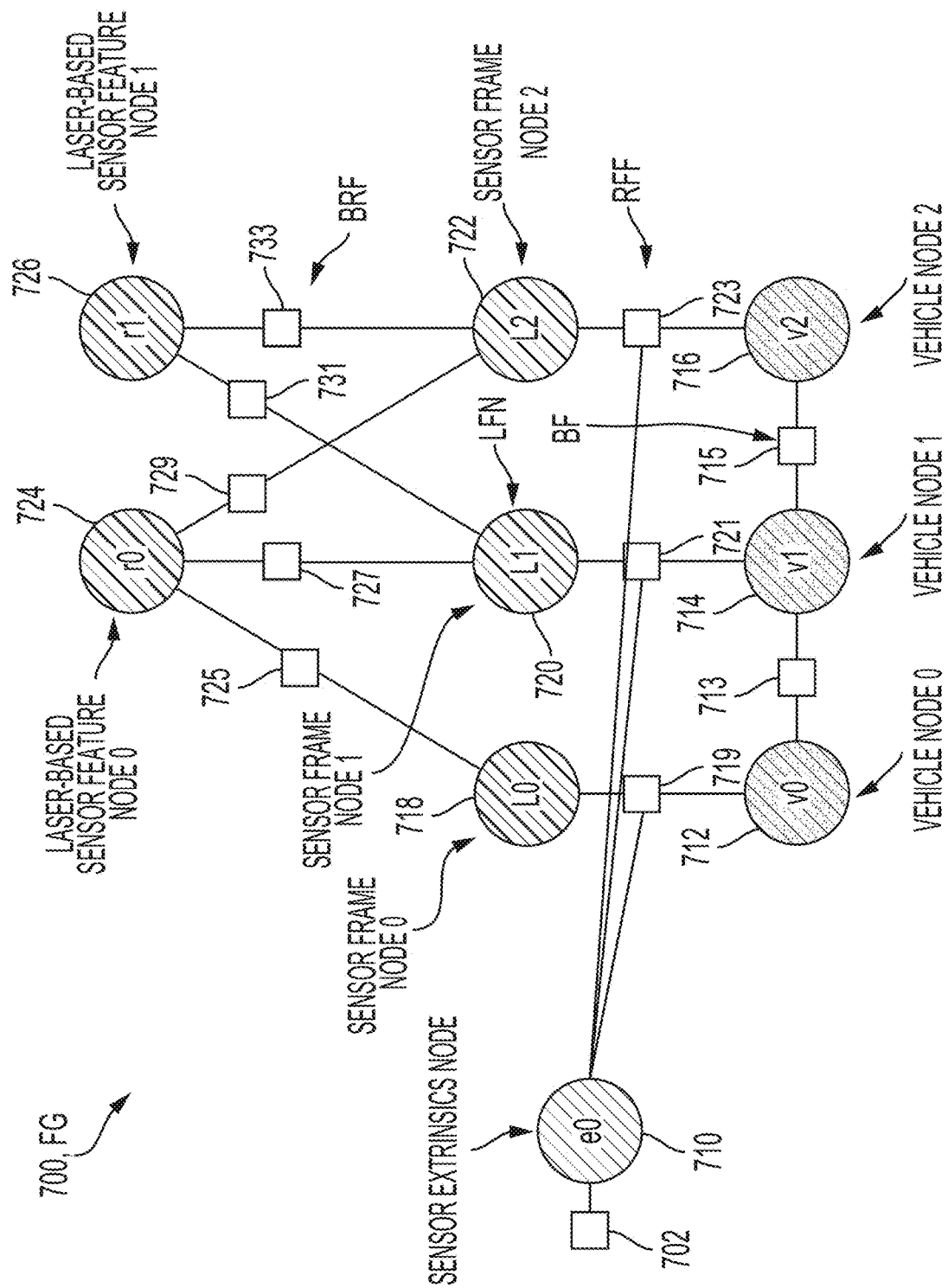
FIG. 7 schematically depicts a factor graph for a mapless calibration of a laser-based sensor of a materials handling vehicle in an environment, according to one or more embodiments shown and described herein.
Figure 8:
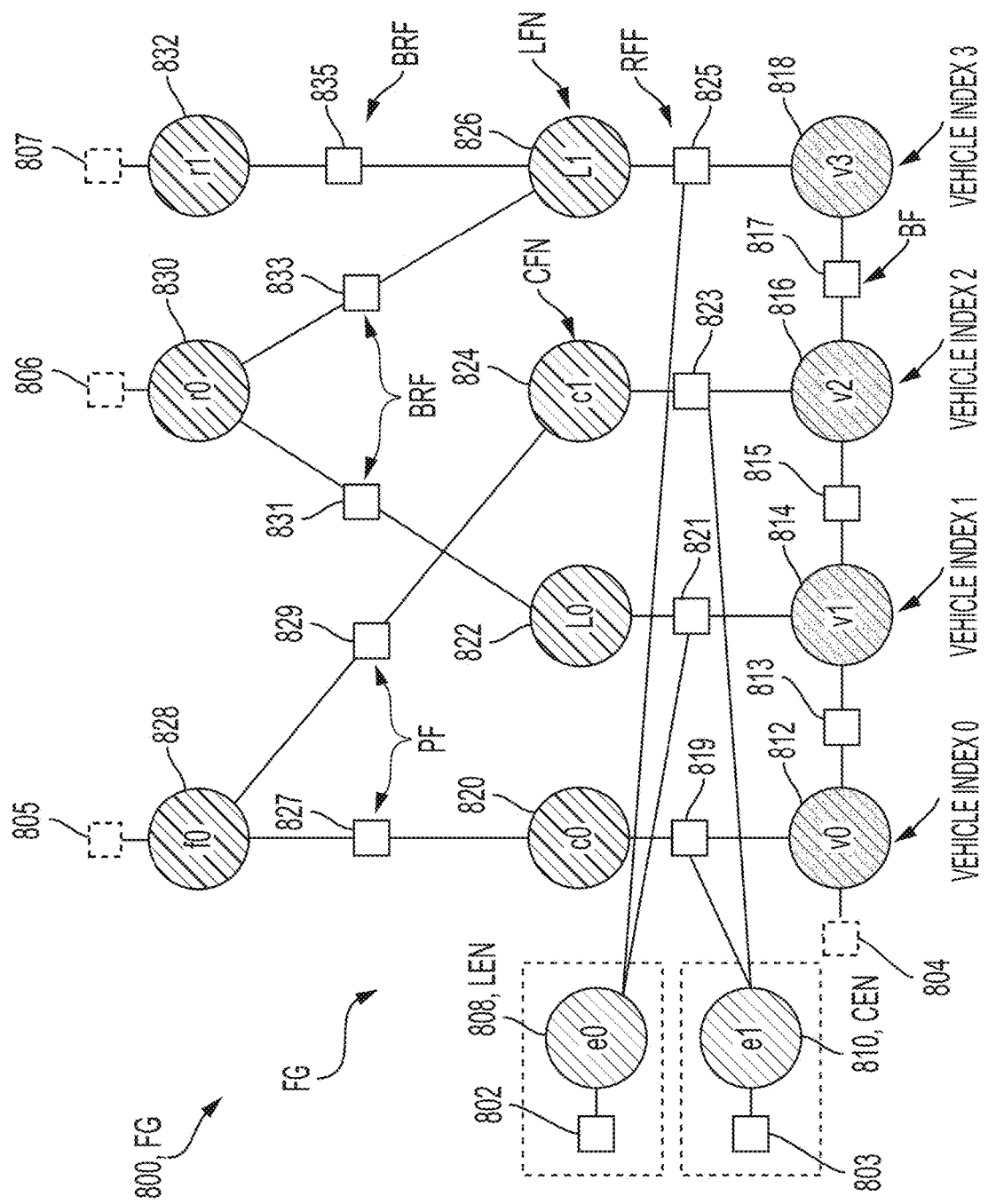
FIG. 8 schematically depicts a factor graph of a mapless combination sensor calibration including an image-based sensor and a laser-based sensor of a materials handling vehicle in an environment, according to one or more embodiments shown and described herein.
Figure 11A:
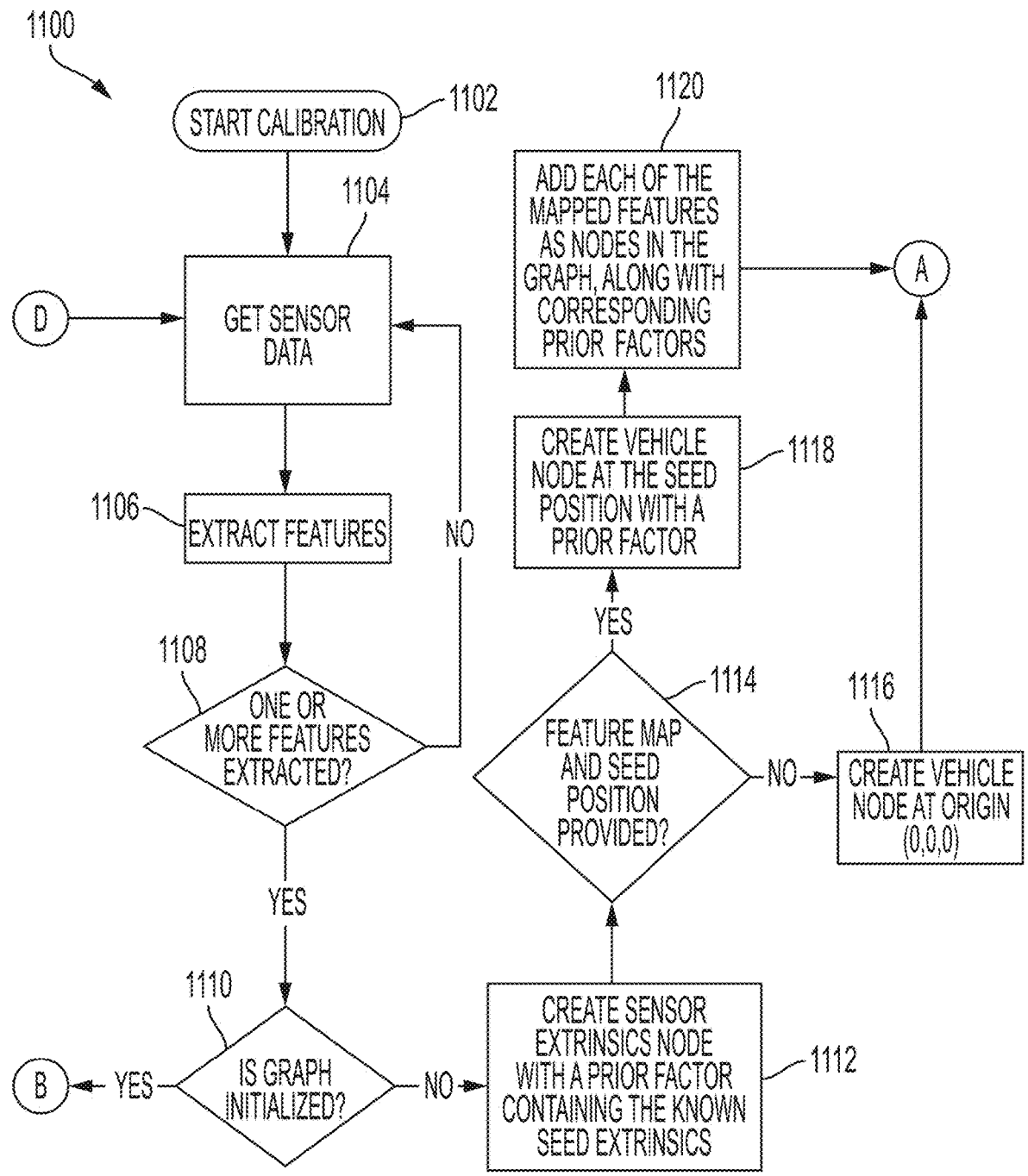
FIG. 11A depicts a first subset of a flowchart illustrating a method of building a factor graph and calibrating a sensor of a materials handling vehicle utilizing the factor graph, according to one or more embodiments shown and described herein.
Figure 11B:
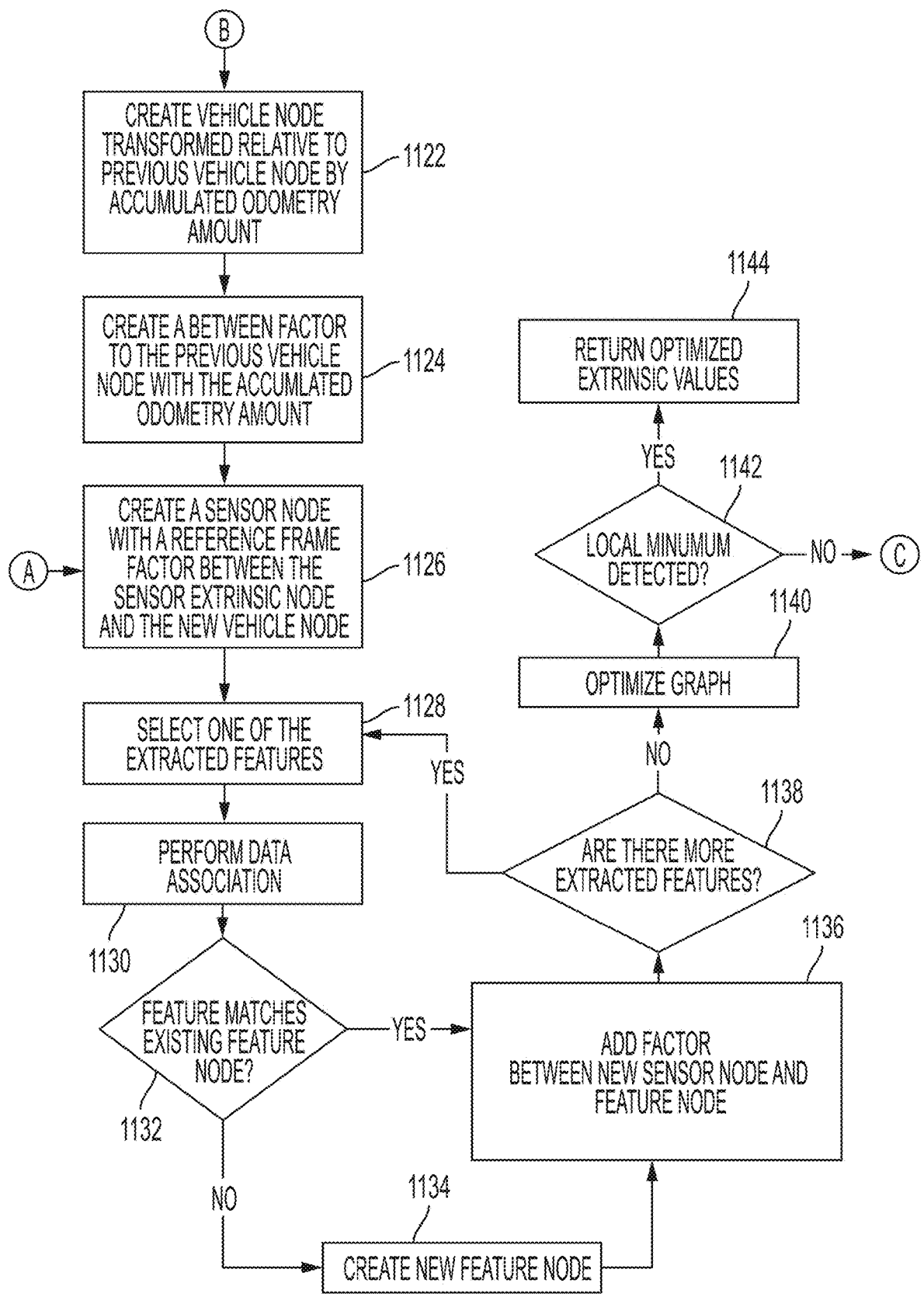
FIG. 11B depicts a second subset of the flowchart of FIG. 11A.
Figure 11C:
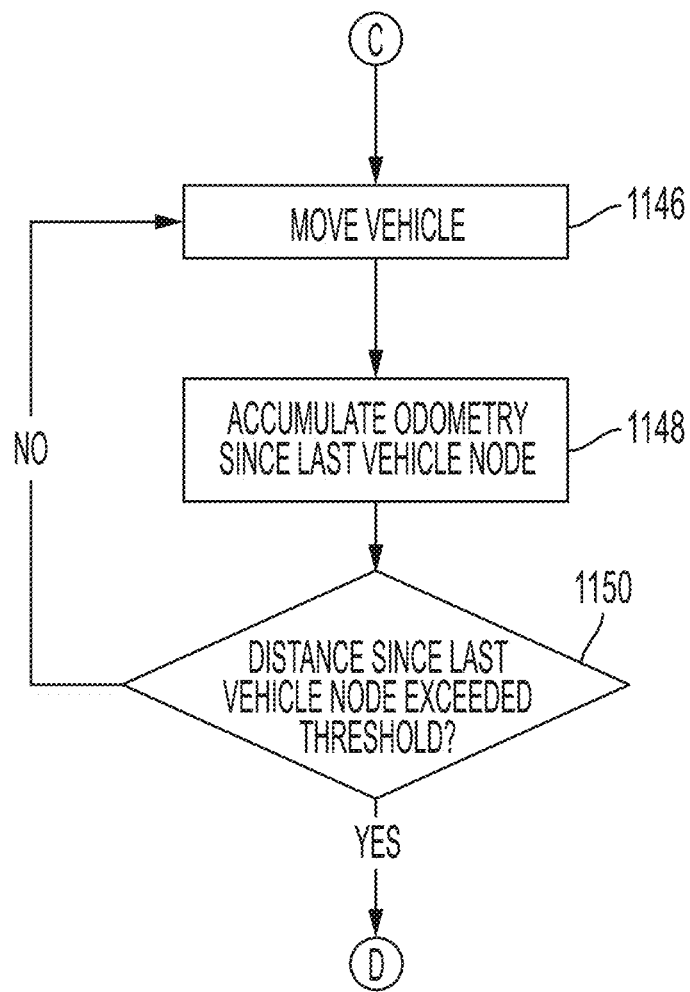
FIG. 11C depicts a third subset of the flowchart of FIG. 11A.

Referring now to FIGS. 5A-8, illustrative examples of different factor graphs for calibration of various sensors (e.g., a camera and/or laser system) coupled to a materials handling vehicle are depicted. FIG. 5A is directed to a factor graph FG, 500 built from a mapped configuration using an image-based sensor such as a camera 110A in which a site map 142 of the warehouse environment 10 is referenced that includes one or more mapped features such as stored overhead feature locations and an initial vehicle seed position known. FIG. 5B is directed to a factor graph FG, 500' built from a mapped configuration using a laser-based sensor 110B, such as a laser rangefinder, LIDAR, or the like, and in which a site map 142 of the warehouse environment 10 is referenced. The site map of the warehouse environment 10 includes one or more mapped features such as stored overhead feature locations and calibration coordinate frame such that an initial vehicle seed position may be known with respect to the site map. FIG. 6 is directed to a factor graph FG, 600 built from a mapless configuration using an image-based sensor such as a camera in which an initial vehicle position is not known and is set as the original of a calibration coordinate frame and features are extracted by the sensor as described in greater detail below and referenced with respect to the calibration coordinate frame mapping. FIG. 7 is directed to a factor graph FG, 700 built from a mapless configuration similar to FIG. 6 yet using a laser-based sensor 110B configured to determine a bearing range to a feature, which as a laser reflective surface disposed within the environment. FIG. 8 is directed to a factor graph FG, 800 built from a mapless configuration (e.g., if not including dashed position prior factor 804 and dashed prior factors 805, 806, 807) or mapped configuration (e.g., if including dashed position prior factor 804 and dashed prior factors 805, 806, 807) that is a combination of FIGS. 6-7 (e.g., mapless) or FIGS. 5A-5B (e.g., mapped) in which both an image-based sensor 110A and a laser-based sensor 110B are used to build a factor graph. FIGS. 11A-11C, described in greater detail further below, describe how each of the factor graphs of FIGS. 5A-8 are constructed by the one or more calibration processes as described herein.

While initially referring to FIG. 5A for reference, the following generally applies to each factor graph depicted and described herein. A factor graph 500 may include nodes 510, 512, 514, 516, 518, 520, 522, 524, 526 (e.g., observed values) and factors 502, 504, 506, 508, 519, 521, 523, 525, 527, 529, 531, 533. Factors disposed between nodes represent formulas indicative of a probabilistic function or an uncertainty of a transform or relationship between nodes. Initial factors prior a node (e.g., a prior factor) are representative of an initial uncertainty for the respective node. For example, in embodiments, the prior factors model the initial uncertainty of various states utilized by an optimizer as described herein. Node 510 is representative of sensor extrinsics. As a non-limiting example, camera extrinsics may include manufacturing tolerances and specifications for the camera model as well as pose (e.g., roll, pitch and yaw, x, y, and/or z position) of the camera (or generally the sensor) as measured and installed with tolerances on the materials handling vehicle 100. Another node may be vehicle nodes 512, 514, and 516. The vehicle nodes 512, 514, and 516 may be indicative of coordinates of the vehicle at respective locations in the calibration coordinate frame CCF. These locations may be derived from sensors that determine odometry of the materials handling vehicle 100. Another node may be a sensor frame node 518, 520, 522 (also referred to as a camera frame node, CFN), which may be defined by the frames captured at the vehicle node by the camera. Additionally, image-based sensor feature nodes 524 and 526 for an image-based sensor such as a camera, for example, may be determined and populated within the factor graph 500.

Figure 3:
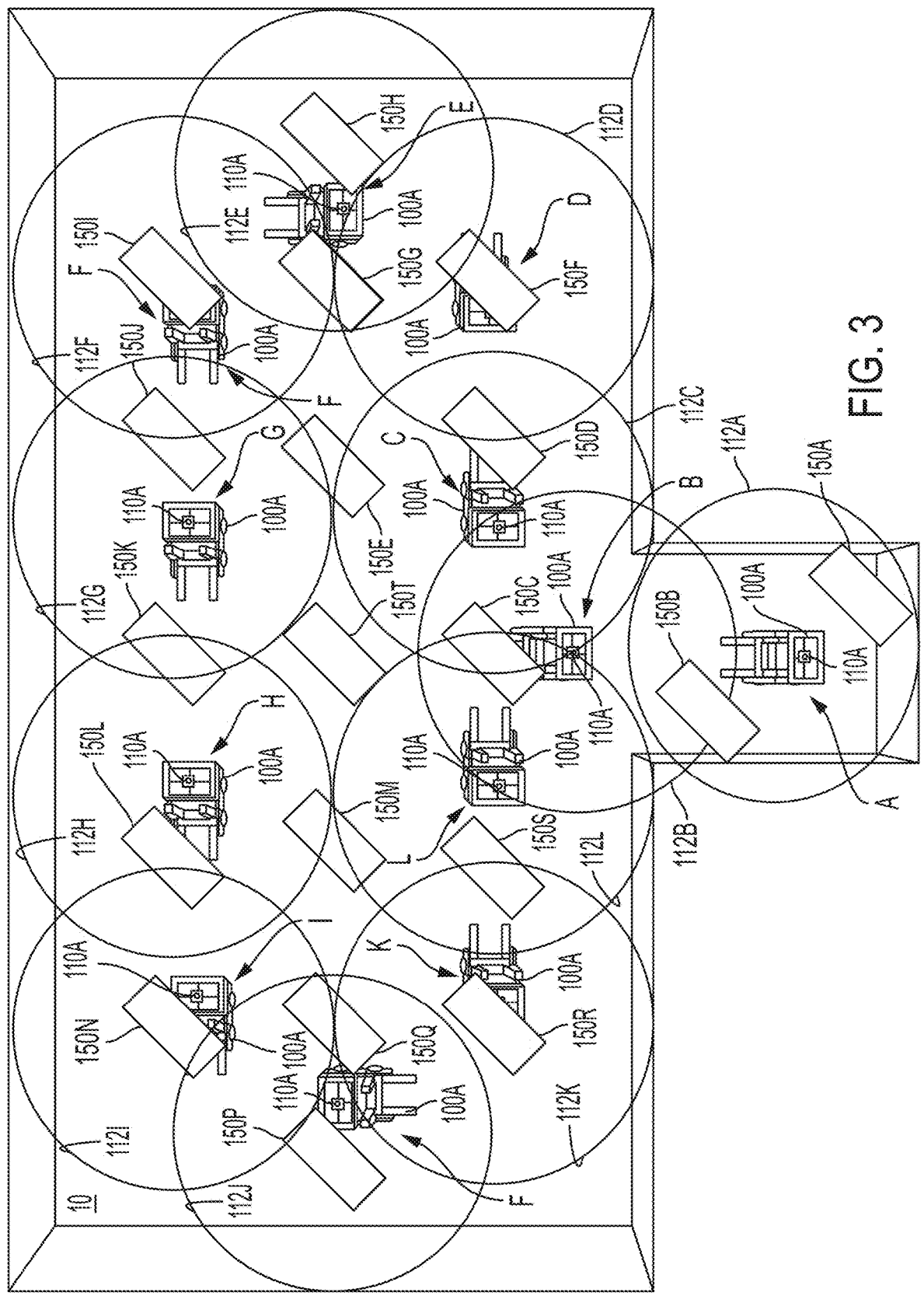
FIG. 3 depicts an illustrative time-lapsed diagram of a materials handling vehicle at multiple positions during mapping and calibration of the warehouse environment of FIG. 1.

As referred to herein, "frames" may be one or more frames captured with respect to the unique image areas 112A, depicted in FIG. 3, which may include at least one static overhead feature that is captured by an image sensor (e.g., image-based sensor) or other type of sensor (e.g., lase-based sensor) that is being calibrated. For example, frames are certain instances of data generated from the sensor to be calibrated disposed on the materials handling vehicle 100 during travel of the materials handling vehicle 100. The certain instances may be selected when the materials handling vehicle 100 exceeds a linear or angular absolute travel distance threshold while capturing images and/or when a set of observations (e.g., not necessarily from a single sensor) pass a set of heuristics that indicates the observations should provide information that will aid in the optimization error reduction. In embodiments, a combination of such frames may be used to determine a position of one or more materials handling vehicles 100 in the calibration coordinate frame (CCF) as well as a pose of one or more sensors capturing the images with respect to the one or more vehicles on which the one or more sensors are positioned.

In embodiments utilizing an image-based sensor such as a camera in a mapless configuration (e.g., in FIG. 6), frame data may be utilized to determine the position of the materials handling vehicle 100 in the CCF as a vehicle node, and a camera frame node (CFN) may be attached to a vehicle node and to a camera extrinsics node (CEN) to model pose of the camera with respect in the CCF with respect to the materials handling vehicle 100. Features from a current image may be associated with a previous image to attach to a CFN and to build the factor graph (FG). For example, such association may occur through using a pixel velocity nearest neighbor image space tracking algorithm or any algorithm that tracks a feature from frame to frame without prior knowledge of a position of the feature in the CCF. In some embodiments, features may be grouped over multiple (e.g., continuous or non-continuous) frames. The associated features may then be attached to the CFN, which may result in multiple CFNs to reference a single sensor feature node, and which may be implemented through use of projection factors in, for example, the mapless configuration.

In general, as each frame is selected from the data collected by the sensor 110, a factor graph FG may be populated. Factor graphs model observations with uncertainty, in which the observations are directly related to each other by factors. Further, factor graphs do not include time as a variable and do not have to rely on a forward time factor. Factor graphs are graphical models for modeling complex estimation problems such as Simultaneous Location and Mapping (SLAM) or Structure from Motion (SFM). A factor graph acts is a bipartite graph including factors connected to nodes (also referred to as variables) as described below. Variables represent unknown random variables in the estimation problem, and factors represent probabilistic information on those variables derived from measurements or prior known information. For example, referring to FIG. 5A for reference, nodes may include sensor extrinsics node (e0) 510, a first vehicle node (v0) 512, a second vehicle node (v1) 514, a third vehicle node (v2) 516, a first sensor frame node (c0) 518, a second sensor frame node (c1) 520, a third sensor frame node (c2) 522, a first sensor feature node (f0) 524 and a second sensor feature node (f1) 526 and factors 513, 515, 519, 521, 523, 525, 527, 529, 531, and 533 linking the nodes to each other.

A node (e.g., 510, 512, 514, 516, 518, 520, 522, 524, 526) may be linked to one or more other nodes (e.g., 510, 512, 514, 516, 518, 520, 522, 524, 526) by way of factors (e.g., 519, 521, 523, 525, 527, 529, 531, 533). The factor graph FG may represent and be utilized to build a constrained optimization problem to be solved. The optimization problem may be constructed using the GTSAM libraries and optimizers. The optimization problem may then be solved and an error metric can be derived from the factor graph FG. The error metric can subsequently be used to determine when to stop the calibration either through display of the calibration factors to a user to select such a minimum error metric or an algorithm may automatically stop the calibration when the error is within or under a predetermined value. Non-limiting examples of such calibration algorithms are described below with respect to FIGS. 9-10.

In embodiments, a toolkit such as the GTSAM library may provide solutions to SLAM and SFM problems, and can also be used to model and solve optimization problems, utilizing a C++ library based on factor graphs. In general, optimization of a factor graph seeks to reduce the overall error of all factors in the factor graph. Factors are value elements such as direct or indirect observations or values for the optimization problem. Factors and variables/nodes within the factor graph FG may exist in multiple coordinate frames. Factor graphs may include a variety of types of nodes and a variety of types of factors.

As a non-limiting example, the type of nodes may include one or more vehicle nodes, one or more sensor frame nodes (image-based and/or laser-based as described herein), a sensor extrinsics node per respective sensor, and one or more sensor feature nodes (image-based and/or laser-based). These nodes may be applied for either mapped or mapless configurations as described herein.

Each vehicle node may be associated with a two-dimensional (2D) pose, a 3D pose (e.g., x, y, z, roll, pitch, yaw or any subset thereof), or the like, in a global reference frame including, for example, an x position value, a y position value, and yaw. Yaw is indicative of a rotation around a z-axis, also referred to as a heading. In embodiments, the x and y position values may be in meters, and the yaw may be in radians.

Each sensor frame node, whether image-based or laser-based, is associated with a three-dimensional (3D) pose in the global reference frame including, for example, an x position value, a y position value, a z position value, roll, pitch, and yaw. Roll is indicative of a rotation around an x-axis, and pitch is indicative of a rotation around a y-axis. In embodiments, the x, y, and z position values may be in meters, and the roll, pitch, and yaw values may be in radians.

Each sensor extrinsics node per respective sensor, whether image-based or laser-based, is associated with a three-dimensional position or pose (e.g., x, y, z, roll, pitch, yaw or any subset thereof) such as in a local reference frame with respect to the vehicle to describe a pose delta between a kinematic vehicle center and a stored origin of the sensor. The three-dimensional pose includes, for example, an x position value, a y position value, a z position value, roll, pitch, and yaw.

Each sensor feature node, whether image-based or laser-based, is associated with a three-dimensional pose of a feature in the global reference frame. In embodiments, the feature may be an overhead feature including, but not limited to, a ceiling light, skylight, or the like as described herein for capture by an image-based sensor and/or a laser-based sensor.

By way of example, and not as a limitation, the types of factors may include prior factors, between factors (BF), reference frame factors (RFF), projection factors (PF), bearing-range factors, or the like. Prior factors provide an initial estimate for a value (node/variable). A prior factor may be a 2D pose estimate (e.g., including x, y, and yaw) for an initial vehicle position in the mapped calibration process, which is further described with respect to the position prior factor 504 in FIG. 5A. In embodiments, the position prior factor 504 may be provided by a user or automatically based on vehicle localization with respect to a site map. Another example of a prior factor may be a 3D point estimate (e.g., including x, y, and z) for the mapped features in the mapped calibration process, which is further described with respect to prior factors 506 and 508 of FIG. 5A and prior factors 506' and 508' of FIG. 5B.

Furthermore, a prior factor in either a mapped configuration or a mapless configuration may be a 3D pose estimate (e.g., including x, y, z, roll, pitch, and yaw) for the seed sensor extrinsic value, as may be provided by based on manufacturing tolerances, which is further described with respect to prior factor 502 of FIG. 5A for an image-based sensor 110A, prior factor 502' of FIG. 5B for a laser-based sensor 110B, prior factor 602 of FIG. 6 for an image-based sensor 110A, prior factor 702 of FIG. 7 for a laser-based sensor 110B, prior factor 802 of FIG. 8 for a laser-based sensor 110B, and prior factor 803 of FIG. 8 for an image-based sensor 110A.

Prior factors (e.g., factors 502, 504, 506, and 508 of FIG. 5A), include priors and/or initial values, which codify known values and/or uncertainties at creation of the factor graph, such as the position prior factor 504 setting the position of the materials handling vehicle 100. With respect to the factor graphs illustrated in FIGS. 5A-8 and described in detail below, each of the factor graphs are merely illustrating various calibrations of various sensors with and without the use of a site map of an environment for which the materials handling vehicle is being deployed for respective mapped and mapless configurations. Unless as otherwise described, descriptions of nodes and/or factors with respect to FIG. 5A apply to the nodes and factors of FIGS. 5B-8.

Between factors (BF) describe a relationship between two nodes, such as two vehicle nodes. For example, a between factor is representative of a 2D pose delta indicative of a change of x, y, and yaw between two vehicle nodes (e.g., as provided by the accumulated odometry). An embodiment of such between factors are depicted and described with respect to factors 513 and 515 in FIG. 5A.

Reference frame factors (RFF) may be used to calculate the relationship between two reference frames, which may be, for example, two different types of nodes. For example, the reference frame factor may be indicative of a 3D pose describing the relationship (e.g., as a delta change) between a kinematic center of the vehicle and a reference frame of the sensor. In an embodiment, the reference frame factors 519, 521 and 523 of FIG. 5A are used to calculate and/or optimize the sensor extrinsics node 510 based on the relationships between the vehicle nodes 512, 514 and 516 and the sensor frame nodes 518, 520 and 522.

Projection factors (PF) may be used to describe the relationship between an observed feature and the reference frame sensor that observed them. Projection factors may be used for sensors that do not have range information. That is, the projection factors use projection models to calculate observation error (e.g., using a pin-hole camera model). In some embodiments, a feature location is provided in the local sensor coordinates (e.g., in pixels (u, v) in u-v coordinate space associated with UV mapping involving 3D modeling of a 2D image to a 3D model surface) and may be projected as an infinite line into the global 3D coordinates (e.g., in meters for x, y, and z position values). Referring to FIG. 5A, projection factors 525, 527, 529, 531 and 533, describe how the image-based sensor feature nodes 524 and 526 were observed from the sensor frame nodes 518, 520, and 522 (e.g., camera frame nodes CFN) with consideration of the intrinsic properties of the image-based sensor. In embodiments, projection factors may be used for mapped image-based calibration processing (e.g., FIG. 5A). Further, projection factors may be used for mapless image-based calibration processes (e.g., FIG. 6) that do not require an initial prior factor estimate for a matched feature.

As a further type of factor, a bearing-range factor (BRF) describes the relationship between an observed feature and the reference frame of the sensor that observed it, such as, for example, from a sensor that provides range and bearing information. Referring to FIG. 7, bearing-range factors may include factors 725, 727, 729, 731, and 733 and similar factors of FIGS. 5B and 8 associated with a laser-based sensor and features detected by the sensor. Bearing range factors may be provided with a range measurement (e.g., in meters) and a bearing measurement (e.g., in radians) in the local coordinates of the respective sensors, and error may be calculated based on transformation into a global 3D space to include x, y, and z positions (e.g., in meters).

Still referring to FIG. 5A, the factor graph 500 for a mapped camera calibration of a materials handling vehicle is depicted and described in more detail. In this embodiment, calibration of a sensor that is a camera is completed with the use of a site map. Camera extrinsics node 510 including roll, pitch, yaw, x, y, and/or z position of the camera and expected variance (i.e., standard deviation) are set up with reference to a prior factor 502 of the camera's seed position with uncertainty of the extrinsic values. When using a site map the materials handling vehicle is seeded within the site map by associating the vehicle is a location within the site map as indicated through a position prior factor 504. Since the materials handling vehicle is seeded (i.e., the vehicles actual location in an environment is associated with a location in the site map) there is a level of uncertainty that is modeled by the position prior factor 504. The seed position is indicative of an origin of the initial vehicle pose (v0). As referred to herein, "origin" refers to the seed location (or initial position v0) of the vehicle in a calibration coordinate frame. The origin v0 may be set at the Origin O of the calibration coordinate frame CCF or may be an arbitrary origin v0, which is not the Origin O of the calibration coordinate frame CCF. The seed extrinsics values (e.g., sensor extrinsics node e0) are based on the manufacturing tolerances of the sensor mounted on the materials handling vehicle. An initial sensor frame (e.g., sensor frame node, c0) may be calculated by composing the sensor extrinsics node e0 on the initial vehicle pose v0. This becomes the origin v0 (either at the Origin O or otherwise set arbitrary beginning location) of the calibration coordinate frame CCF, and the initial vehicle pose v0 models the position of the vehicle at the seed position. A new $V_x$ (e.g., v1 514) value may be calculated using observed dead reckoning between $V_x$ (e.g., v1 514) and $V_{x-1}$ (v0 512), and a between factor (e.g., 513 and 515) is added therebetween indicative of an uncertainty with respect to the observed dead reckoning. A sensor frame node 518, 520 and 522 representing a camera frame node models a pose of the camera in a same coordinate frame for each of the $V_x$ factors, and the sensor frame nodes 518, 520, and 522 are linked to the reference frame factors 519, 521, and 523 of each camera frame at respective vehicle nodes 512, 514, 516. Observations, such as overhead features observed by the camera, are made as generic projection factors observed multiple times and associated between frames. In an embodiment, logic is provided to deduce a position of an observed feature from multiple observations. Projection factors 525, 527, 529, 531, 533 are created to link to each sensor feature node 524 and 526 observed in a current frame. A many to many, one to one, one to many, or many to one relationship may exist between sensor frame nodes 518, 520, and 522 and sensor feature nodes 524 and 526.

In some embodiments, once a fully formed factor graph exists, an optimizer is run to minimize error in all factors by moving all the nodes. However, in some embodiments, the optimizer may be implemented at any time while the factor graph is being constructed. As such, construction of the factor graph may stop when sufficient information is built into the factor graph such that the optimizer may formulate an optimization problem for determining the calibration factors. Moreover, a read of eO with minimized error may determine the optimized camera extrinsics for camera calibration, as described in greater detail below.

Referring now to FIG. 5B, a factor graph 500' for a mapped laser calibration of a materials handling vehicle is depicted and described in more detail. In some embodiments, the image-based sensor/camera 110A described with respect to FIG. 5A, may instead be a laser-based sensor 110B that is being calibrated using a site map. For example, sensor extrinsics node 510' may include roll, pitch, yaw, x, y, and/or z position of the laser and expected variance (i.e., standard deviation), which are set up with reference to prior factor 502' of the laser's seed position with uncertainty of the extrinsic values. Furthermore, when using a site map the materials handling vehicle is seeded within the site map by associating the vehicle is a location within the site map as indicated through a position prior factor 504'.

The laser records a sensor node (e,g., 518', 520', 522') as laser nodes associated with vehicle nodes 512', 514' and 516' such that laser node 518' is associated with vehicle node v0, 512', laser node 518' is associated with vehicle node v1, 514' and laser node 518' is associated with vehicle node v2, 516'. Laser-based sensor feature nodes 524' and 526' are determined by the laser are depicted with respect to each laser node 518', 520' and 522' may be associated through bearing-range factors 525', 527', 529', 531' and 533' defining the relationship between laser nodes 518', 520' and 522' and laser-based sensor feature nodes 524' and 526'.

Referring now to FIG. 6, a factor graph 600 for a mapless camera calibration of a materials handling vehicle in an environment is depicted. The calibration depicted in factor graph FG 600 does not include the use of a site map (e.g., is mapless), therefore the initial position information of a materials handling vehicle 100 is denoted as vehicle node v0, 612. For example, an initial position v0 is illustrated on the calibration coordinate frame CCF of FIG. 4, which in this case is not the Origin O. As a non-limiting example, the initial position information may be an arbitrary location within the environment and need not be localized with respect to a site map 142 or any other reference location. As the materials handling vehicle 100 travels, estimated positions of the materials handling vehicle 100 as vehicle locations 0, 1, 2, etc. (i.e., v0, v1, v2, etc.) are recorded as vehicle nodes 612, 614, 616, for example, based on odometry. Between factors 613, 615 are disposed between such vehicle nodes 612, 614, 616. Further, in the positions of the calibration coordinate frame CCF of vehicle nodes, the sensor as a camera records a sensor frame node 618, 620, 622 associated with each vehicle nodes 612, 614, 616, such as sensor frame node c0, 618 associated with vehicle node v0, 612; sensor frame node c1, 614 associated with vehicle node v1, 620; and sensor frame node c2, 616 associated with vehicle node v2, 622. Image-based sensor feature nodes 624, 626 depicted with respect to each sensor frame node 618, 620, 622 may be associated through projection factors 625, 627, 629, 631, 633 defining the relationship between adjacent sensor frame nodes 618, 620, 622 and image-based sensor feature nodes 624, 626.

Referring now to FIG. 7, a factor graph 700 for a mapless laser calibration of a materials handling vehicle in an environment is depicted. Factor graph 700 is similar to factor graph 600 (FIG. 6) except here a sensor being calibrated is part of a laser-based system modeled in the factor graph. Sensor extrinsics node 710 directed to laser extrinsic node (LEN) may include roll, pitch, and yaw, x, y, and/or z position of the laser and expected variance (i.e., standard deviation) which are set up with reference to prior factor 702 of the laser's seed position with uncertainty of the extrinsic values. The calibration depicted in the factor graph 700, FG does not include the use of a site map (e.g., is mapless). Therefore, the initial position information as vehicle node 712 is set as an origin of a materials handling vehicle 100 and is denoted as vehicle node v0 (e.g., having a coordinate location of v0, FIG. 4). As a non-limiting example, the initial position information may be an arbitrary location within the environment and need not be localized with respect to a site map 142 or any other reference location. As the materials handling vehicle 100 travels, estimated positions of the materials handling vehicle 100 as vehicle locations 0, 1, 2, etc. (i.e., vehicle nodes v0, v1, v2, etc.) are recorded as vehicle nodes, 712, 714, 716, for example, based on odometry. Between factors 713 and 715 are disposed between such vehicle nodes 712, 714, 716. Further, with respect to the positions within the calibration coordinate frame CCF of vehicle nodes, the laser records respective laser nodes 718, 720, 722 associated with each vehicle node 712, 714, 716, such as laser node L0, 718 associated with vehicle node v0, 712; laser node L1, 720 associated with vehicle node v1, 714; and laser node L2, 722 associated with vehicle node v2, 716. Laser-based sensor feature nodes 724, 726 representative of feature information as determined by the laser are depicted with respect to each sensor frame node 718, 720, 722 and may be associated through bearing-range factors 725, 727, 729, 731, 733 defining the relationship(s) between sensor frame nodes 718, 720, 722 and laser-based sensor feature nodes 724, 726.

A laser localization system may identify features similar to those identified through image data of a camera, for example edges of objects or features within an environment by employing a laser system such as a LIDAR system. In some embodiments, the laser based localization system may identify bearing ranges to reflector objects positioned throughout an environment. Reflector objects may be analogous to lights for cameras in that the reflector objects are the features that the laser system uses to map environment and calibrate the laser-based sensor 110B with as a camera 110A would with lights.

Referring now to FIG. 8, a factor graph 800 for the calibration of a mapless localization system implementing a combination of a camera and a laser of a materials handling vehicle in an environment is depicted. In embodiments, inclusion of a dashed position prior factor 804, indicated by a dashed line, and as described herein with respect to use of a position prior factor relating to initial vehicle position and use of a site map, would allow for the calibration of a mapped localization system implementing a combination of a camera and a laser of a materials handling vehicle in an environment.

Sensor extrinsics node 808 may include roll, pitch, yaw, x, y, and/or z position of the laser and expected variance (i.e., standard deviation), which are set up with reference to prior factor 802 of the laser's seed position with uncertainty of the extrinsic values. Sensor extrinsics 810 may include roll, pitch, yaw, x, y, and/or z position of the camera and expected variance (i.e., standard deviation), which are set up with reference to prior factor 803 of the camera's seed position with uncertainty of the extrinsic values. Similar to the factor graphs in FIGS. 6 and 7, the calibration described with reference to FIG. 8 and modeled in factor graph 800, FG does not include the use of a site map (e.g., is maples). Therefore, the initial position information of vehicle node 812 is set as the origin of a materials handling vehicle 100 and is denoted as vehicle node v0 (e.g., having a coordinate location of v0 on the calibration coordinate frame CCF of FIG. 4). As the materials handling vehicle 100 travels, estimated positions of the materials handling vehicle 100 as vehicle locations 0, 1, 2, 3 etc. (i.e., vehicle nodes v0, v1, v2, v3, etc.) are recorded as vehicle nodes 812, 814, 816, 818, for example, based on odometry. Between factors 813, 815, 817 are disposed between such vehicle nodes 812, 814, 816, and 818.

In some positions of the vehicle nodes 812, 814, 816, 818 in the calibration coordinate frame CCF, the camera records a camera frame node 820, 824 associated with vehicle nodes 812, 816, such as camera frame node c0, 820 associated with vehicle node v0, 812, and camera frame node c1, 824 associated with vehicle node v2, 816. Feature node 828 depicted with respect to camera frame nodes 820, 824 may be associated through projection factors 827, 829 defining the relationship between adjacent camera frame nodes 820, 824 and feature node 828.

Further, with respect to the vehicle nodes 812, 814, 816, 818, the laser records laser nodes 822, 826 associated with vehicle nodes 814, 818, such that laser node L0, 822 is associated with vehicle node v0, 814, and laser node L1, 826 is associated with vehicle node v3, 818. Laser-based sensor feature nodes 830, 832 determined by the laser are depicted with respect to each laser node 822, 826 and may be associated through bearing-range factors 831, 833, 835 defining the relationship between laser node 822, 826 and laser-based sensor feature nodes 830, 832.

It should be understood that the factor graphs provide a method of relating observed information collected by the sensor or sensors being calibrated with vehicle locations and features within the environment. Through the relationships between a vehicle location (i.e., vehicle node) and observed features (e.g., as a laser-based sensor feature node and/or image-based sensor feature node), a laser and camera may be calibrated. As described above, the relationships between the variables/nodes are defined through factors. The factors may represent probabilistic information on those variables. In some embodiments, the factors may define factor functions that relate to the transformation between nodes. During optimization, the error for each of the variables may be minimized such that the probabilistic information relating those variables is maximized.

Figure 9:
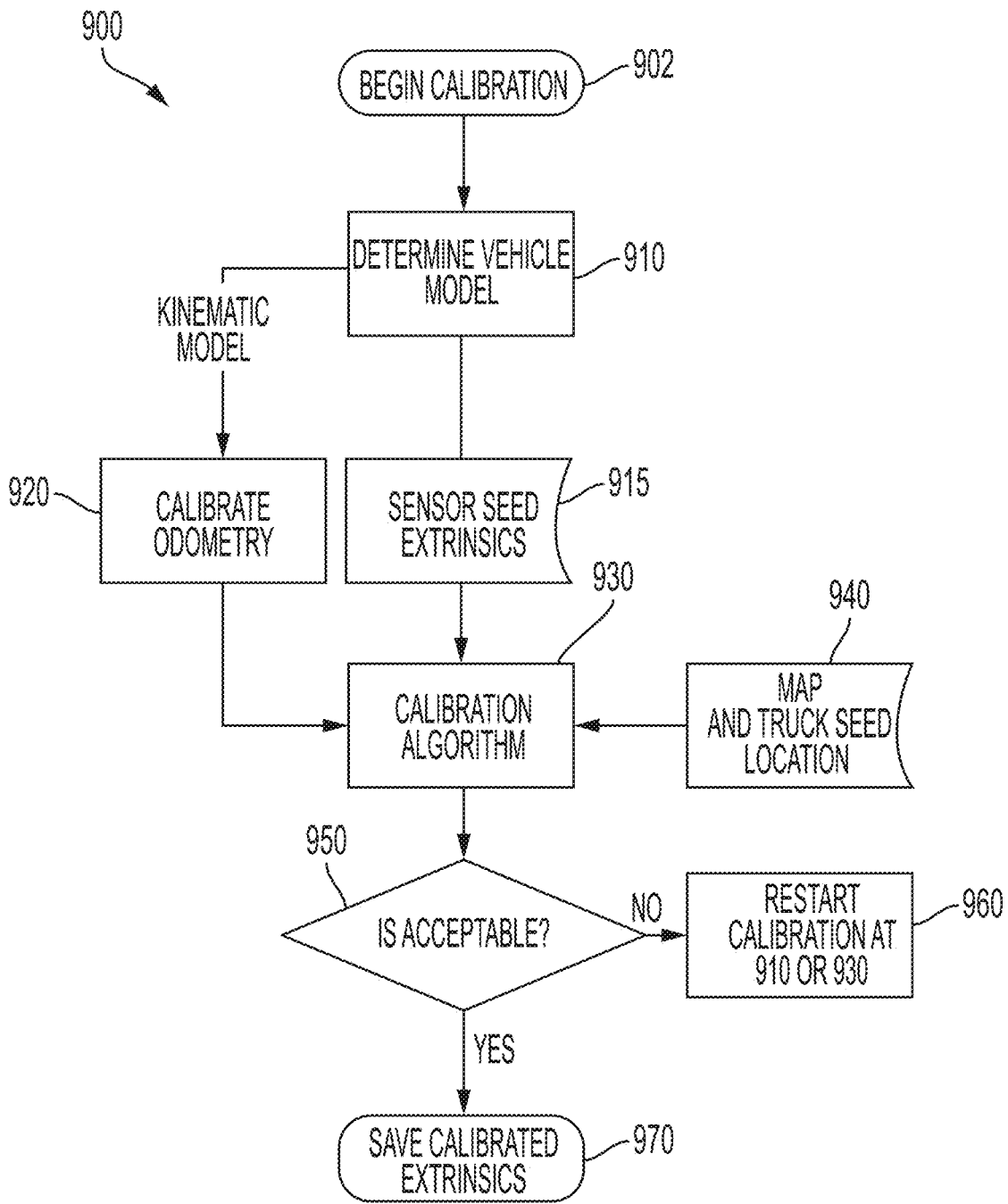
FIG. 9 depicts a flowchart illustrating another method of calibrating a sensor of a materials handling vehicle, according to one or more embodiments shown and described herein.
Figure 10:
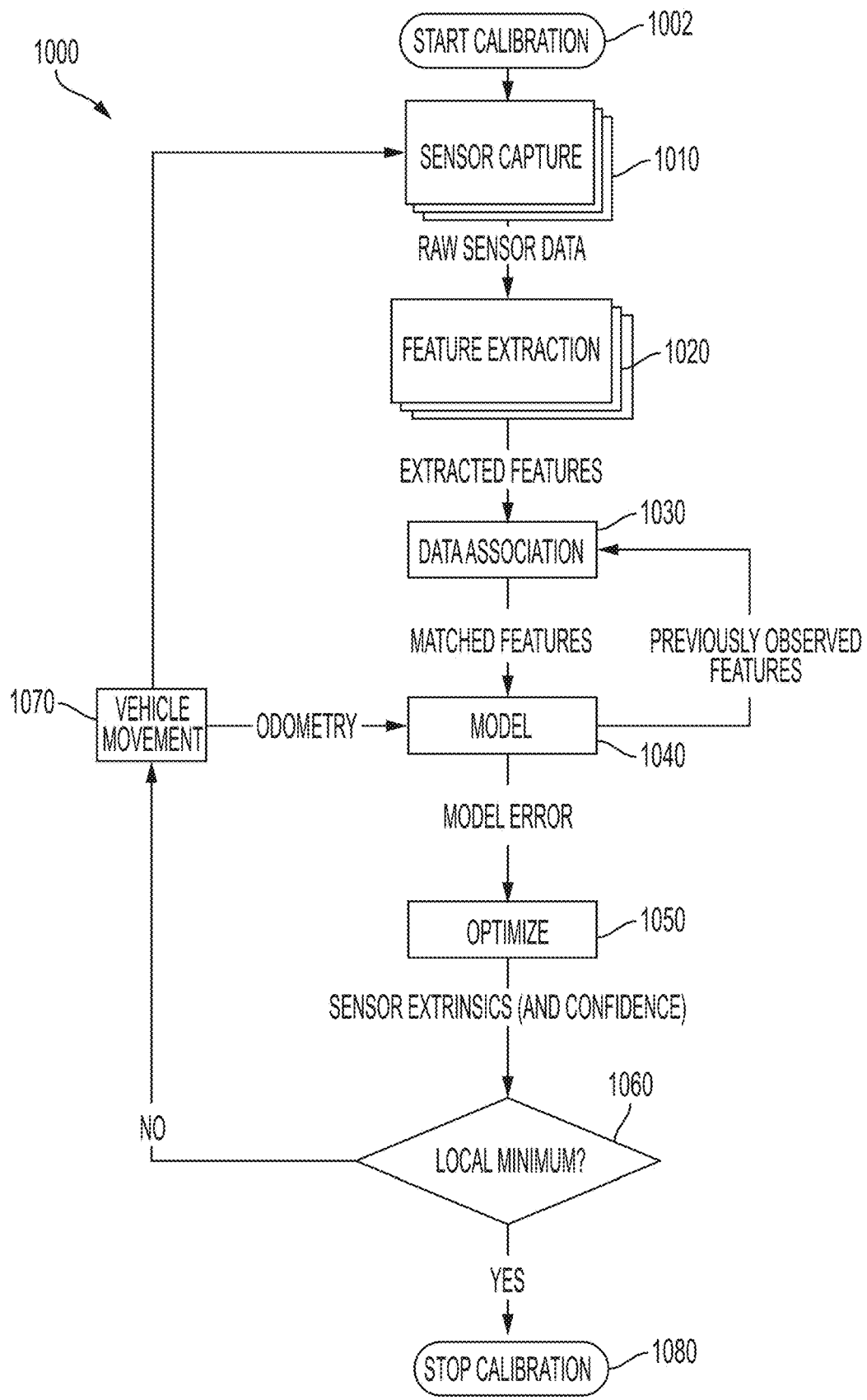
FIG. 10 depicts another flowchart illustrating a method of calibrating a sensor of a materials handling vehicle through applying a calibration algorithm process, according to one or more embodiments shown and described herein.

Turning now to FIGS. 9-11C, several flowcharts illustrating a method of calibrating a sensor of a materials handling vehicle are depicted. FIGS. 9-10 depict processes of applying a calibration algorithm through use of an optimizer in mapped or mapless configurations. FIGS. 11A-11C depict a method of calibration which builds factors graphs, such as the factor graphs of FIGS. 5A-8 described above, and use the factor graphs to calibrate a sensor with respect to a position of the senor on a materials handling vehicle as described herein.

Referring to FIG. 9, a flowchart 900 illustrating a method of calibration of a sensor is depicted that may be applied to a mapped or mapless calibration system. Sensor calibration begins at block 902. Calibration of a sensor may be initiated automatically by the system or manually through a GUI interface or command prompt interface of a computing device. In some embodiments, calibration may automatically initiate when a materials handling vehicle is first activated. In some embodiments, as shown in block 910, an initial step of calibration includes determining and/or confirming the vehicle model of the materials handling vehicle. The vehicle model may be determined manually by inputting the vehicle model or selecting the vehicle model through a computing device. Alternatively, the vehicle model may be automatically determined through a preprogrammed identifier or through the computing device completing a scan and registration of the components connected thereto. That is, the computing device may be able to automatically determine the vehicle model of the materials handling vehicle through a scan of the hardware that is installed. For example, a method of model matching may be implemented to determine the model of the materials handling vehicle. That is, as sensor data is collected, for example, from encoders, IMU, imaging devices, laser sensors or the like, the data and sources may be compared to a set of known mathematical models to select the type of the materials handling vehicle.

Once the vehicle model is determined, two tasks may be initiated. One task may include the initiation of a kinematic model so that the sensors and systems for determining odometry may be calibrated, as illustrated at block 920. For example, odometry may be calculated by moving the materials handling vehicle back and forth between two known points a few times and comparing the difference between the wheel encoders and an actual distance. Such odometry calibration may be used as described in U.S. Pat. No. 9,921,067, issued Mar. 20, 2018, entitled SYSTEMS AND METHODS FOR MATERIALS HANDLING VEHICLE ODOMETRY CALIBRATION, as assigned to Crown Equipment Corporation.

At block 930, the odometry calibration determined at block 920 and sensor seed extrinsics may be received as inputs to the calibration algorithm. In mapped embodiments, the calibration algorithm at block 930 may also receive a site map and the truck seed location as an input from block 940. However, as discussed above, calibration of the sensors for localization of the materials handling vehicle may not include a site map (e.g., may be mapless). In such instances, block 940 may only provide an input of a truck seed location as having a coordinate reference (that may be an arbitrary coordinate reference or be set as (0,0,0) with respect to x, y, and yaw) on a calibration coordinate frame as described herein. In some embodiments, the seed location may be any arbitrary coordinate within the calibration coordinate frame. At block 930, the calibration algorithm is executed and calibration extrinsics for the sensor are determined. Example calibration methods as described herein may be used for the calibration algorithm.

If the calibration extrinsics are determined to be acceptable at block 950, then the calibration extrinsics are saved as the calibrated extrinsics at block 970. However, in the event the calibration extrinsics determined at block 930 are determined not to be acceptable at block 950, then the calibration may be restarted at block 960, returning to either block 910 or block 930. Prior to restarting the calibration at block 960, analysis of the calibration extrinsics determined at block 930 and/or analysis of the previously completed calibration process may be completed at block 960. The analysis at block 960 may be configured to determine whether a particular issue with the calibration process can be identified which leads to unacceptable calibration extrinsics. For example, the analysis may determine that an incorrect vehicle model of truck was determined at block 910 or the calibration path executed while executing the calibration algorithm was insufficient (e.g., did not include motion in a particular direction, that is, the vehicle only traveled in a straight line and did not execute a turn during calibration). As a result, block 960 may determine that the calibration may be restarted at an intermediate step at block 930 and not from the beginning. For example, if the vehicle did not complete a diverse enough path to generate acceptable calibration extrinsics, then the calibration may be restarted by continuing the calibration algorithm at block 930. However, if the vehicle model was incorrectly determined at block 910, then the calibration may be restarted at block 930 to determine the correct vehicle model.

Referring now to FIG. 10, another example flowchart 1000 illustrating a method of calibrating a sensor of a materials handling vehicle is depicted as a non-limiting example of a calibration algorithm. For example, the flowchart depicted in FIG. 10 may be an implementation of the calibration algorithm implemented at block 930 in FIG. 9. Calibration is initiated at block 1002. As discussed with reference to FIG. 9, calibration may be initiated automatically or manually. Once initiated, sensor data is captured by the sensor(s) of the materials handling vehicle at block 1010. In some embodiments, sensor data may be captured by the sensor being calibrated as well as other sensors. For example, sensor data from sensors used to determine odometry (e.g., as determined at block 1070) as well as a sensor data from a camera may be collected at block 1010. Features are then extracted from the raw sensor data collected at block 1010. In block 1020, for example, features are extracted by one or more algorithms configured to identify, isolate, and/or extract features from the sensor data. Feature extraction may employ algorithms such as utilize object and image detection and recognition techniques such as scale-invariant feature transform ("SIFT"), speeded up robust features ("SURF"), Blob detection methods, and edge-detection algorithms. Such algorithms may identify features and/or detect objects within the sensor data that may be used as features that the calibration method may associate with future or previously observed features from future or previously collected sensor data. An example of such feature extraction techniques that may be utilized herein is described in U.S. Pat. Nos. 9,170,581 and 9,606,540, both assigned to Crown Equipment Corporation.

At block 1030, the calibration method associates the extracted sensor data with previously observed features. Some data association methods that may be implemented include, but are not limited to, image to image, pixel velocity tracking nearest neighbor, joint compatibility branch and bound "JCBB", or the like. For example, but without limitation, the extracted sensor data may include a feature defining a first light fixture and a previously observed feature may also include the first light fixture observed from previous iteration of sensor capture and feature extraction. Features from a current image may be associated with a previous image to attach to the camera frame node and to build a factor graph FG. At block 1030, the extracted feature and the previously observed feature may be matched. For example, such association may occur through using a pixel velocity nearest neighbor image space tracking algorithm or any algorithm that tracks a feature from frame to frame without prior knowledge of a position of the feature in a calibration coordinate frame (CCF). The associated features may then be attached to a camera frame node (CFN), which may result in multiple camera frame nodes referenced to a single sensor feature node, and which may be implemented through use of a projection factor. In some embodiments, for example those utilizing a map or a mapless system, data association techniques may match observations from the current frame to features already existing in the model (e.g., utilizing algorithms such as nearest neighbor or JCBB). That is, data association of a sensor feature node may be accomplished through an image to image mapping or an image to model mapping.

That is, at block 1040, with reference to the factor graphs discussed herein, projection factors and/or bearing-range factors may relate the sensor data (e.g., the camera extrinsics at the materials handling vehicle's current location) with the first light fixture that was observed previously from a different location and at the materials handling vehicle's current location. If a previous observation was not made, the extracted sensor data may be added as a new node to the factor graph in a mapless calibration. One or more frames may be created accordingly and added to a factor graph FG to create an optimization problem.

The materials handling vehicle's location may be provided to the model based on odometry information generated at block 1070 through movement of the materials handling vehicle and in an initial iteration of the method from the raw sensor data captured at block 1010. Association of data at block 1030 may be repeated for one or more extracted features and previously observed features where each matched feature is added to the factor graph or calibration model and/or each non-matched feature is added as a new feature to the factor graph or calibration model. Furthermore, at block 1040, model error values may be determined and an optimization problem may be defined from the model, for example, a factor graph.

The optimization problem is solved at block 1050 to produce a calibration output. Sensor extrinsics and/or confidence values are determined based on the calibration output determined through solving the optimization problem. If the sensor extrinsics and/or confidence values indicate a local minimum at block 1060, such that adding additional information to the factor graph does not result in a significant change to a total graph error, then the calibration is complete and the sensor extrinsics based on the calibration output are stored as calibration values at block 1080 and the calibration is ended. The calibration results may be passed on to block 950 of FIG. 9. However, in some embodiments, if adding additional information to the factor graph does result in a significant change to the total graph error at block 1060, the materials handling vehicle continues to move about an environment at block 1070, generating further odometry and raw sensor data from at least the sensor being calibrated and returning to block 1010. This may be continued until the addition of added information to the factor graph does not result in a significant change to the total error of the graph. In such a case, the calibration may be ended. It should be understood that the previous method is only a non-limiting embodiment of a method of calibrating a sensor of the materials handling vehicle.

Referring now to FIGS. 11A-11C, a flowchart combining subsets of an example method of building a factor graph FG and calibrating a sensor 110 of a materials handling vehicle 100 utilizing the factor graph is depicted. The materials handling vehicle 100 comprises the sensor 110, a vehicle position processor 130, one or more vehicle dead reckoning components, and a drive mechanism configured to move the materials handling vehicle 100 along an inventory transit surface. The one or more dead reckoning components may comprise an odometer comprising odometry logic 126. The sensor 110 is configured to record one or more features of a warehouse (e.g., the warehouse environment 10), and the vehicle position processor 130 is configured to generate sensor data 144 from a recordation of one or more features 150, as recorded by the sensor 110. In an embodiment, the sensor 110 is a camera configured to capture the one or more features 150 of the warehouse, and the vehicle position processor is further configured to generate the sensor data 144 from the recordation of the one or more features, as captured by the camera. Corresponding image-based factor graphs FG, generated in embodiments described herein and in greater detail below, are depicted in FIGS. 5A and 6 as respective factor graphs 500, 600. Additionally or alternatively, the sensor 110 is a laser configured to detect the one or more features of the warehouse, and the vehicle position processor further configured to generate the sensor data 144 from the recordation of the one or more features, as detected by the laser. Corresponding laser-based factor graphs FG, generated in embodiments described herein and in greater detail below, are depicted in FIGS. 5B and 7 as respective factor graphs 500', 700. A corresponding image-based and laser-based factor graph FG, generated in embodiments described herein and in greater detail below, is depicted in FIG. 8 as factor graph 800.

With respect to FIG. 11A, calibration is initiated at block 1102. As discussed with reference to FIG. 9, calibration may be initiated automatically or manually. Once initiated, sensor data 144 from the sensor 110 being calibrated is collected and received at block 1104. The sensor data may include image data collected by a camera and/or range bearing data collected by a laser sensor through, for example, a laser scan, or a combination of both. The sensor data is processed and features are extracted at block 1106. For instance, the vehicle position processor 130 is configured to extract the one or more features 150 from the sensor data 144.

Features may be extracted through several means. For example, as described above, feature extraction may employ algorithms such as utilize object and image detection and recognition techniques such as scale-invariant feature transform ("SIFT"), speeded up robust features ("SURF"), Blob detection methods, and edge-detection algorithms. Such algorithms may identify features and/or detect objects within the sensor data that may be used as features that the calibration method may associate with future or previously observed features from future or previously collected sensor data.

At block 1108, the system determines whether one or more features have been extracted from the sensor data. If no features have been extracted, or at least successfully extracted, then additional sensor data is collected by system by returning the process to block 1104. If no additional features are to be extracted from the sensor data as determined at block 1108, then the system proceeds to determine whether the factor graph is initialized at block 1110. If the factor graph has not been initialized, the system proceeds with steps to initialize the factor graph at block 1112. At block 1112, the system creates a sensor extrinsics node with a prior factor containing the known seed extrinsics (e.g., prior factor 502 and sensor extrinsics node e0, 510 illustrated in FIG. 5A). For instance, the vehicle position processor 130 is configured to create a factor graph FG including a sensor extrinsics node (e0) comprising initial seed extrinsics associated with the sensor 110.

Next, at block 1114, the system determines whether a site map 142 of the warehouse environment 10 (that may incorporate a feature map of one or more features within the warehouse environment) and a materials handling vehicle seed position are provided. In other words, this step determines whether the calibration method is a mapless or map based calibration. The vehicle position processor 130 may be configured to generate, in the factor graph FG for either the mapped or mapless configuration as described below, an initial vehicle node (v0), an initial sensor frame node (c0), and an initial sensor feature node (f0), the initial sensor feature node (f0) comprising a selected one of the one or more extracted features associated with the initial sensor frame node (c0) and the initial vehicle node (v0) in an initial data association.

The vehicle position processor 130 is further configured to generate, in the factor graph FG, the initial vehicle node (v0) as a mapless initial vehicle node at an origin when a vehicle seed position and a feature map are not provided. Thus, if no site map 142 and materials handling vehicle seed position are provided, the system operates under a mapless configuration and creates a first vehicle node (e.g., node v0, 612 illustrated in FIG. 6) in the factor graph. In such a case, the first vehicle node may be configured at an arbitrary origin defined by an origin coordinate value (0, 0, 0) at block 1116 such that the origin is defined by the origin coordinate value (0, 0, 0) in a sensor calibration frame associated with the sensor 110.

The vehicle position processor 130 is further configured to generate, in the factor graph FG, the initial vehicle node (v0) as (i) a map-based initial vehicle node at a vehicle seed position with (ii) an associated vehicle prior factor and (iii) one or more mapped features from a site map 142 as corresponding sensor feature nodes along with (iv) corresponding mapped feature prior factors when the vehicle seed position and a feature map comprising the one or more mapped features are provided. The associated vehicle prior factor for the map-based initial vehicle node at the vehicle seed position may include an error function with respect to an accuracy of the vehicle seed position of the materials handling vehicle with respect to the site map 142. Thus, if alternatively site map 142 and materials handling vehicle seed position is provided, the system operates under a mapped configuration and creates a first vehicle node (e.g., node v0, 512 illustrated in FIG. 5A) at the seed position at block 1118. The vehicle node will also include a prior position factor in the mapped configuration (e.g., position prior factor 504 illustrated in FIG. 5A). The prior position factor may define a probability or error function with respect to the accuracy of the seeding location of the materials handling vehicle with reference to the site map 142. Each of the mapped features based on the site map 142 are added as nodes to the factor graph along with the prior factors for each mapped feature at block 1120. In the embodiments, which include a site map 142 for calibration of the sensor, the mapped features defined in the site map 142 are the features that the system will associate sensor data from the sensor to during the calibration.

The vehicle position processor 130 is further configured to navigate the materials handling vehicle 100 using the drive mechanism along the inventory transit surface, and generate, in the factor graph FG, a subsequent vehicle node (v1) based on an accumulated odometry amount from the one or more vehicle dead reckoning components. Referring back to block 1110, if the factor graph is initialized at item B, then a second vehicle node (e.g., node v1, 514 or 614 illustrated in FIGS. 5A and 6, respectively) that is transformed relative to the first vehicle node based on the accumulated odometry from vehicle movement (i.e., described in more detail with respect to blocks 1146, 1148 and 1150 between items C and D) is created and added to the factor graph in block 1122. Additionally, between factors that link the first vehicle node to the second vehicle node defining the probabilistic relationship or an error function for the transformation in location of the vehicle is generated at block 1124. The vehicle position processor 130 may be configured to generate, in the factor graph FG, a vehicle between factor between the subsequent vehicle node (v1) and the initial vehicle node (v0) based on the accumulated odometry amount. The between factors may define the error in determining second vehicle node from the first vehicle node. In other words, the between factors describe the transformation between two vehicle poses along with the associated uncertainty of that transform.

The vehicle position processor 130 is further configured to generate, in the factor graph FG, a subsequent sensor frame node (e1) associated with the sensor extrinsics node (e0), the subsequent vehicle node (v1), and one of the initial sensor feature node (f0) or a subsequent sensor feature node (f1) in a subsequent data association. Once the factor graph is initialized in block 1110, for example during a first iteration of the calibration process or the second vehicle node location is determined and created within the factor graph through blocks 1112-1124, a factor is added to the factor graph at block 1126 that corresponds with item A. By way of example and not as a limitation, reference frame factor 619 is added linking the first vehicle node v0, 612 to sensor node c0, 618 illustrated in FIG. 6, or reference frame factor 719 is added linking the first vehicle node v0, 712 to sensor node L0, 718 illustrated in FIG. 7. The linking reference frame factor defines the relationship between the position of the materials handling vehicle 100 and sensor node.

At block 1128, one of the extracted features as determined at block 1106 is selected. The selected extracted feature is attempted to be associated with an existing feature from, for example, one or more previously extracted features and/or features already defined from the site map 142. If the selected extracted feature matches an existing feature, at block 1132, a factor (e.g., a projection factor 525 illustrated in FIG. 5A) is generated and added to the factor graph linking the sensor node to the matched feature defined in the factor graph at block 1136. As a non-limiting example, the added factor may be a projection factor for a camera feature or a bearing range factor for a laser feature. Thus, the vehicle position processor 130 may be configured to select one feature of the one or more extracted features, associate the one feature with an existing feature as a matched sensor feature node when the one feature and the existing feature match, and generate, in the factor graph FG, a projection factor to link a generated sensor frame node with the matched feature node. The generated sensor frame node may include one of the initial sensor frame node (c0) or the subsequent sensor frame node (e1), the matched sensor feature node may include one of the initial sensor feature node (f0) or the subsequent sensor feature node (f1), and the existing sensor feature may be defined in a site map 142.

Alternatively, in an embodiment, if the selected one of the extracted features does not match an existing feature, then a new feature node may be created and added to the factor graph at block 1134. However, in other embodiments, the addition of an extracted feature that does not match an existing feature is not a requirement. Subsequently, a factor (e.g., a projection factor 625 illustrated in FIG. 6) is generated and added to the factor graph linking the sensor node to the new feature node defined in the factor graph at block 1136. Thus, the vehicle position processor 130 may be configured to select one feature of the one or more extracted features, generate, in the factor graph, a new sensor feature node associated with the one feature when the one feature and an existing feature do not match, and generate, in the factor graph FG, a projection factor to link a generated sensor frame node with the new sensor feature node. The new sensor feature node may include one of the initial sensor feature node (f0) or the subsequent sensor feature node (f1). While the above steps and processes are described with respect to a mapless calibration method, it is to be understood that similar steps and process flow may be employed in a process to implement a mapped calibration system and method.

The system at block 1138 then determines whether more extracted features exist. For example, the system determines whether there are any additional extracted features identified during the current iteration of the calibration method to associate with existing features or add to the factor graph. If there are additional extracted features to associate with existing features or add to the factor graph, then block 1138 causes the system to return to block 1128 for further processing of the next extracted feature. However, if there are no additional extracted features to associate with existing features or add to the factor graph, then block 1138 causes the system to proceed to block 1140 at which the vehicle position processor 130 is configured to optimize the factor graph FG to provide a calibration output associated with the sensor 110 based on the initial data association and the subsequent data association. The vehicle position processor 130 may be further configured to navigate the materials handling vehicle 100 along the inventory transit surface based on the calibration output associated with the sensor 110.

Referring to block 1140, the system optimizes the factor graph to provide a solution as a calibration output. Further, the vehicle position processor 130 may be further configured to optimize the factor graph when no further features of the one or more extracted features remain to associate with existing features as corresponding matched sensor feature nodes or add to the factor graph as corresponding new sensor feature nodes. In some embodiments, the system can be optimized at any time and not at every step, such as where optimization may be triggered at a particular time. For example, the system may optimize the factor graph by generating a constrained optimization problem based on the factors and variables defined in the factor graph. The system determines whether a local minimum is achieved during the optimization of the factor graph, at block 1142. If a local minimum is detected and, for example, a threshold minimum is achieved, an acceptable calibration error is determined, or the like, then the optimized extrinsic values from the factor graph are returned at block 1144 and may then be passed to a second filter at the block 950 (FIG. 9) to determine acceptability. In some local minima embodiments, determining the optimizer has reached a local minima, at block 1142, may include identifying a case where providing the optimizer with any more data will not result in a significant change to the output. In some embodiments, block 1142 determines that a local minimum is achieved when a threshold value is achieved and held for a predefined period of time. In acceptability embodiments, block 950 may determine that the calibration values determined from the optimization of the factor graph are acceptable based on the rate of change of the error that is below a predetermined value. In some acceptability embodiments, tolerance matching to an expected calibration value, analysis of optimized path characteristics (total travel distance, total angular travel, time taken, speed, etc.), sensor convergence, feature diversity, characteristics of the factor graph (distribution of weights, structure, discontinuities), spot check with existing localization algorithm or other mechanisms may be implemented to determine when the calibration values are acceptable calibration values. In embodiments, an acceptability determination determines that the calibrated values are acceptable based on provided context through one or more heuristic checks including, but not limited to, path characteristics, sensor coverage, geometric constraint checks, comparison to predetermined acceptable calibrations, comparison to calibration averages over a vehicle fleet population, and/or spot check using other localization systems. Such acceptability determinations may utilize domain specific knowledge in view of a wider context of a specific truck or sensor to detect one or more failures of the one or more optimizers.

The vehicle position processor 130 may be further configured to optimize the factor graph by generation of the constrained optimization problem based on one or more factors and one or more variables defined in the factor graph. The one or more variables are representative of unknown random variables in the constrained optimization problem and include one or more nodes as described herein, such as one or more of the sensor extrinsics node (e0), the initial vehicle node (v0), the subsequent vehicle node (v1), the initial sensor frame node (c0), the subsequent sensor frame node (c1), the initial sensor feature node (f0), and the subsequent sensor feature node (f1). The one or more factors as described herein may be representative of probabilistic information with respect to select factors of the one or more factors and may include a prior factor, a between factor, a reference frame factor, a projection factor, a bearing-range factor, or combinations thereof.

As further described herein, the constrained optimization problem may be constructed using one or more smoothing and mapping (SAM) libraries and optimizers. In an embodiment, the one or more features 150 comprise one or more overhead lights of the warehouse, and the constrained optimization problem is constructed using an image recognition algorithm, a data association algorithm, a modeling technique, or combinations thereof. As described herein, the image recognition algorithm is configured to track at least a portion of a static overhead light as one of the one or more features from frame to frame and comprises an edge detection routine, a feature detection routine, an object recognition routine, or combinations thereof. Further, the data association algorithm comprises use of a pixel velocity nearest neighbor image space tracking algorithm to track a feature from frame to frame without prior knowledge of a position of the feature in a sensor calibration frame associated with the sensor. Moreover, the modeling technique comprises a structure from motion (SFM) technique, a simultaneous localization and mapping (SLAM) technique, a smoothing and mapping (SAM) library technique, or combinations thereof.

Returning to block 1142 (FIG. 11B), if no local minimum is detected at block 1142, then the materials handling vehicle is moves to a new location, for example, through a command executed at block 1146 associated with item C. Odometry is accumulated at block 1148 from the last vehicle location to the new vehicle location. In some embodiments, the system determines at block 1150 whether the materials handling vehicle has moved a predetermined distance from the last location. If the materials handling vehicle has not moved at least as far as the predetermined threshold distance, the materials handling vehicle continues to move in response to block 1146. When the vehicle moves at least a predetermined threshold distance, as determined by block 1150, then the calibration method returns to block 1104 associated with item D and new set of sensor data is collected by the senor being calibrated. It is also to be understood and within the scope of this disclosure that, in embodiments, observations from sensors as described herein, and other than odometry sensors, may be utilized to provide data to the optimizer.

It should be understood that the method of calibration illustrated and described with respect to flowchart 1100 in FIGS. 11A-11C in only an example embodiment of calibration of a sensor of a materials handling vehicle that utilizes a factor graph. Those skilled in the art may comprehend modifications to the method that are contemplated within the scope of the present disclosure.

In embodiments, the factor graph (FG) is used to construct and solve a constrained optimization problem to reduce the error metric of, for example, the sensor extrinsics node, such as through reduction to a minimized desired threshold, to determine pose of the sensor relative to the materials handling vehicle 100. FIG. 4 illustrates an example calibration coordinate frame CCF as created by travel of the materials handling vehicle 100 starting from an origin O to map overhead features 150 such as ceiling lights 150A-S to generate the factor graph FG of FIG. 5A and a constrained optimization problem through a path of travel as shown in FIG. 3 and solve for an error metric indicative of a calibrated and acceptable pose of the camera relative to the materials handling vehicle 100.

With respect to FIGS. 2-4, the materials handling vehicle 100 may include and/or be coupled with a vehicle computing device 102, which is shown and described in more detail with reference to FIG. 2. The vehicle computing device 102 may include a processor 130 that may be implemented as one or more processors communicatively coupled to the sensor 110. The processor 130 may be configured to execute logic to implement any of the methods or functions described herein. A memory 120 may also be included and may be utilized for storing logic, including machine-readable instructions that can be communicatively coupled to the processor 130, the sensor 110, or any combination thereof.

In particular, FIG. 2 depicts a computing infrastructure that may be implemented and utilized for a materials handling vehicle 100. The computing infrastructure may include a vehicle computing device 102 including and/or coupled to the sensor 110, motion sensors 114, a memory 120, a processor 130, an accelerometer 132, a gyroscope 134, input/output hardware 136, network interface hardware 138, and a data storage component 140 in communication with each other by way of a local communication interface 105. The components of the vehicle computing device 102 may be physically coupled together and/or may be communicatively coupled via the local communication interface 105 (e.g., may be implemented as a bus) or other interface to facilitate communication among the components of the vehicle computing device 102.

The sensor 110 may be any device capable of collecting sensor data that may be used for localization of a materials handling vehicle 100. The sensor 110 may be communicatively coupled to the processor 130 and other components of the materials handling vehicle 100. The sensor 110 may include a digital still camera, a digital video camera, an analog still camera, an analog video camera, and/or other device for capturing an overhead image. Additionally or alternatively, the sensor 110 may include other positioning and localization sensor systems, for example, a LIDAR system, a RADAR system, ultrasonic sensor systems or the like coupled to the materials handling vehicle.

The processor 130 may include an integrated circuit, a microchip, and/or other device capable of executing machine-readable instructions or that has been configured to execute functions in a manner analogous to machine readable instructions. The memory 120 may be configured as volatile and/or nonvolatile memory and as such, may include random access memory (including SRAM, DRAM, and/or other types of RAM), ROM flash memory, a hard drive, secure digital (SD) memory, registers, compact discs (CD), digital versatile discs (DVD), and/or other types of non-transitory computer-readable mediums capable of storing logic, such as machine readable instructions. Depending on the particular embodiment, these non-transitory computer-readable mediums may reside within the vehicle computing device 102 and/or external to the vehicle computing device 102 as described in greater detail further below. As such, the memory 120 may store operating logic 122, sensor logic 124 and odometry logic 126, and calibration logic 128 for providing the instructions and facilitating the functionality described herein.

For example, the operating logic 122 may include an operating system and/or other software for managing components of the vehicle computing device 102. The sensor logic 124 may cause the materials handling vehicle 100 to determine the localized position of the materials handling vehicle 100 with respect to the warehouse environment 10 via sensor data 144 captured by the sensor 110, for example, of the ceiling lights 150A-S.

The odometry logic 126 may be utilized to generate and calibrate the odometry data, as described herein. The odometry logic 126 may also cause the materials handling vehicle 100 to navigate along the floor of the warehouse environment 10. In some embodiments, the odometry logic 126 may receive one or more signals from one or more sensors, for example, one or more motion sensors 114, one or more accelerometers 132, one or more gyroscopes 134, one or more wheel angle sensors or the like, to determine a path the materials handling vehicle 100 has traversed over a period of time. Some other odometry methods may include laser scan matching and/or visual odometry. More particularly, the odometry logic 126 may be configured to determine a change in location of the materials handling vehicle 100 from a first location to a second location. The sensor logic 124 and the odometry logic 126 may each include a plurality of different pieces of logic, each of which may be embodied as a computer program, firmware, and/or hardware, as an example.

In operation, for example, the materials handling vehicle 100 may determine its current location via a user input, a determination via the vehicle computing device 102 (such as the materials handling vehicle 100 crossing a radio frequency identifier, via a positioning system, etc.), and/or a determination via the remote computing device 170. In some embodiments, the sensor 110 may be a camera configured to capture images of the ceiling, which may include the one or more ceiling lights 150A-S. Some embodiments are configured such that the sensor data 144 (e.g., image data) that the sensor 110 captures may otherwise be compared to a site map 142 to determine the current vehicle location. However, in order to accurately determine a vehicle location based on sensor data 144 captured by the sensor 110, the sensor 110 may need to be calibrated with respect to the materials handling vehicle 100 for which it operates before or without reliance on such a site map 142. Systems and methods for calibrating the sensor 110 and, in some embodiments, assisting to generate a site map 142, as described herein.

Still referring to FIG. 2, the calibration logic 128, as described herein, may be configured to cause the tracking of multiple static features (e.g., ceiling lights 150A-S) in the warehouse environment 10 through the use of a sensor 110 to be calibrated, such as an image-based system (e.g., a camera) and/or laser-based system (e.g., a LIDAR system), to build a constrained optimization problem over multiple observations of multiple static features from different locations in the warehouse environment 10. This data may be used to create such an optimization problem that may be used to optimize the pose of the sensor 110 as it relates to the materials handling vehicle 100. In embodiments described herein, the calibration logic 128 may not use or rely on prior knowledge of the warehouse environment 10 such as a site map 142. In some embodiments, the process of calibrating the sensor 110 may also result in the formation of a site map 142 that may be used later to localize or supplement localization of the materials handling vehicle 100 in the warehouse environment 10.

Referring again to FIG. 2, the motion sensors 114 may be any sensors capable of detecting or determining motion of the materials handling vehicle 100. For example, the motion sensors 114 may include an optical, microwave, acoustic or illumination sensor configured to detect motion or the change in a warehouse environment 10 as a function of the detected motion. Some such sensors may include infrared sensors, ultrasonic ranging sensors, photo resistors, or the like. In some embodiments, the motion sensors 114 may include one or more encoders (e.g., optical, mechanical, or electro-mechanical) positioned to detect the movement of one or more wheels of the materials handling vehicle 100. The motion sensors 114 may also include one or more sensors capable and configured to detect the angle or directional heading of the materials handling vehicle 100. Furthermore, the materials handling vehicle 100 may include at least an accelerometer 132 and/or gyroscope 134 in communication with the vehicle computing device 102.

The input/output hardware 136 may include and/or be configured to interface with the components of FIG. 2 including the sensor 110, the odometer providing odometry data utilized by the odometry logic 126, and/or the like. The network interface hardware 138 may include and/or be configured for communicating with any wired or wireless networking hardware, including an antenna, a modem, a LAN port, a Wi-Fi card, a WiMax card, Bluetooth™ module, mobile communications hardware, and/or other hardware for communicating with other networks and/or devices. From this connection, communication may be facilitated between the vehicle computing device 102 and other computing devices (such as the remote computing device 170) through, for example, a network 160. The network 160 may include a wide area network, such as the internet, a local area network (LAN), a mobile communications network, a public service telephone network (PSTN) and/or other network and may be configured to electronically and/or communicatively connect the vehicle computing device 102, a remote computing device 170, and/or any other network enabled device.

Still referring to FIG. 2, the data storage component 140 may include any storage device capable of storing logic, such as machine readable instructions and/or data. The data storage component 140 may reside local to and/or remote from the vehicle computing device 102 and may be configured to store one or more pieces of data for access by the vehicle computing device 102 and/or other components. As illustrated, for example, the data storage component 140 may include data defining a site map 142 that may include information generated by the sensor 110 of the materials handling vehicle 100 during calibration or otherwise may be generated and stored, sensor data 144 captured by the sensor 110 of the materials handling vehicle 100 during calibration, and/or calibration data 146 for the sensor 110. The calibration data 146 may include manufacture's tolerances of the sensor to be calibrated and positioned on the materials handling vehicle 100, installation calibration data 146, and/or calibration data 146 determined from calibrating the sensor 110 with respect to the materials handling vehicle 100 in a warehouse environment 10.

It should be understood that while the components in FIG. 2 are illustrated as residing as part of the vehicle computing device 102, this is merely an example. In some embodiments, as described above, one or more of the components may reside external to the vehicle computing device 102. It should also be understood that, while the vehicle computing device 102 is illustrated as a single device, this is also merely an example. In some embodiments, the operating logic 122, the sensor logic 124, the odometry logic 126, and the calibration logic 128 may reside on different computing devices. As an example, one or more of the functionalities and/or components described herein may be provided by remote computing device 170 and/or other devices, which may be communicatively coupled to the vehicle computing device 102. These computing devices may also include hardware and/or software (e.g., implementing methods illustratively shown in FIGS. 9-12) for performing the functionality described herein.

Additionally, while the vehicle computing device 102 is illustrated with the sensor logic 124, the odometry logic 126, and the calibration logic 128 as separate logical components, this is also an example. In some embodiments, a single piece of logic may cause the vehicle computing device 102 to provide the described functionality.

Referring now to FIG. 3, an illustrative time-lapsed diagram is depicted of a materials handling vehicle 100 at multiple positions to provide calibration of a sensor derived from a mapping of a warehouse environment 10. In particular, FIG. 3 depicts a materials handling vehicle 100 at discrete locations in a warehouse environment 10 and the associated image areas 112 defining the area of the ceiling and overhead features such as ceiling lights 150A-S captured in the sensor data 144 by the sensor 110, which in this example is a camera 110A, coupled to the materials handling vehicle 100 at each location. That is, each materials handling vehicle 100A depicted in FIG. 3 is the same materials handling vehicle 100A simply positioned at various locations within the warehouse environment 10. Furthermore, as illustrated, many of the image areas 112A-112L overlap, thereby capturing the same static overhead features (e.g., ceiling lights 150A-150S) in one or more images from different locations along the path of the materials handling vehicle 100A through the warehouse environment 10.

As described in more detail below, the calibration method, in general, relies on calibrating the camera 110A on a materials handling vehicle 100A by collecting image data from the camera 110A at multiple locations in a warehouse environment 10. The image data captured from the camera 110A includes static overhead features that overlap between one or more images captured from different locations.

Still referring to FIG. 3, the method of calibration in the warehouse environment 10 as generally described with respect to the illustrated time-lapsed diagram of a materials handling vehicle 100 at multiple positions. For purposes of explanation, and not as a limitation, each unique position (i.e., identified by letters "A"-"L" in FIG. 3) of the materials handling vehicle 100A, camera 110A, and the image area 112 which defines the image data captured by the camera 110A depicted in FIG. 3 is associated with an appended letter (e.g., "A"-"L") indicating the unique position (e.g., the materials handling vehicle 100A at location A captures image data in image area 112A). More specifically, the camera 110A at location A has an image area 112A which includes two static features, ceiling lights 150A and 150B that are captured by the image data. Location A may be referred to as the initial position in the coordinate frame that is used for the remainder of the calibration.

Unlike calibration that utilizes a site map 142, the materials handling vehicle 100A may be seeded anywhere within the warehouse environment 10 and does not need to be associated with a corresponding location in a site map 142. As such, error in associating the materials handling vehicle 100A with the site map 142 may be eliminated thereby removing the possibility that seeding error results from an incorrect calibration and/or that the calibration fails because the initial seeding of the materials handling vehicle 100A was incorrect or imprecise. However, it is to be understood that the optimizer embodiments described herein may be utilized in mapped and/or mapless configurations.

As the materials handling vehicle 100A begins to move from location A to location B, the path with reference to the coordinate frame is determined and recorded. The path may be determined by using any method of localization that does not include the sensor that is being calibrated. For example, the path may be determined at least based on use of odometry, motion sensors 114, wheel angle sensors, the gyroscope 134, and/or the accelerometer 132. As a result, a vehicle node within the coordinate frame representative of vehicle poses may be determined. For example, if location A is represented as an (x, y, z) coordinate with the initial position being seeded as (0, 0, 0) at an origin (O) (e.g., shown in FIG. 4) of a coordinate reference frame (CRF) and the materials handling vehicle 100A is determined to have traveled, for example, 4 meters in the x direction, then location B may be (4, 0, 0).

In some embodiments, the path and/or the distance traveled from the prior location to the next location may be determined by an algorithm configured to cause the materials handling vehicle 100A to travel a linear or angular distance such that at least one static overhead feature within the image area 112A captured at location A is viewable within the image area 112B captured at location B. As referred to herein, these unique image areas 112A, which may include at least one static overhead feature, are referred to as "frames." Although discrete locations are depicted in FIG. 3, the camera 110A may continuously record image data as the materials handling vehicle 100A traverses a warehouse environment 10, frames including overlapping static overhead features may be selected from the image data for purposes of the calibration.

As noted above with respect to FIG. 3, static overhead features (i.e., ceiling lights 150A-S) captured in one image area 112F are also captured and viewable in another image area 112G. For example, image area 112F and image area 112G share visibility of ceiling light 150J, which overlaps both image area 112F and image area 112B. Tracking of a static overhead feature such as a ceiling light between frames may be accomplished using the pixel velocity nearest neighbor image space tracking algorithm, or any algorithm that is capable to track a feature from frame to frame without prior knowledge of the feature's position in the camera calibration frame. Some image tracking algorithms may include edge detection, feature detection, and/or object recognition routines for tracking a static feature or a portion of the static overhead feature from frame to frame.

Additionally, as the materials handling vehicle 100A moves throughout the warehouse environment 10, a coordinate position relative to the initial position (e.g., seeding position) may be associated with each of the image data for each image area 112 (i.e., with each frame). A plot like the one depicted in FIG. 4 visually represents the path of the materials handling vehicle 100A and the collection of data (e.g., image data by the camera 110A) as the materials handling vehicle 100A travels about the warehouse environment 10. As discussed with reference to FIG. 1, the sensor 110 (e.g., camera 110A) of the materials handling vehicle 100 may capture a view of the same static overhead feature (e.g., ceiling lights 150A-S) from various positions within the warehouse environment 10. The graph in FIG. 4 depicts the position of the materials handling vehicle 100 in a coordinate reference frame and the position of the ceiling lights 150A-S within the same coordinate reference frame (i.e., depicted by the graph in FIG. 4). However, it is noted that the graph in FIG. 4 is merely an example graph and does not directly depict the warehouse environment 10 in FIG. 3.

It should be understood that in such a calibration method, that is one which does not utilize prior knowledge of the environment, the calibration of the camera is made possible through the observation of the same static object from more than one position within an environment. As a result, transformations and the uncertainty between the transformations between the positions may be estimated within the factor graph FG. The factor graph FG may be used to build an optimization problem that can be generated using GTSAM libraries and optimizers where each of the factors of the factor graph FG are optimized while satisfying the constraints defined by the uncertainties of the between factors and the extrinsic such as the camera extrinsics until calibration values within an acceptable predefined value are determined.

The sensor calibration techniques of the present disclosure are well-suited for use at customer sites, in specialized, or generic warehouse configurations. Using optimization and statistical techniques, the sensor calibration is estimated as the materials handling vehicle 100 is driven through the environment. The calibration confidence in this estimate is also calculated and provided to a commissioning engineer as real-time feedback on the progress of the calibration, to assist with determining when to conclude the calibration process. In some embodiments, the calibration process may include online and offline portions. For example, sensor data may be collected by the sensor to be calibrated online while the materials handling vehicle traverses an environment. The sensor data may be stored in a computer readable medium for analysis offline. The stored sensor data can be input into an offline system such as a server or computing device. The offline system may then generate a factor graph or similar model based on the sensor data, optimize the model, and generate calibration values for the sensor that may be subsequently loaded into the computing device of the materials handling vehicle.

Furthermore, the systems and methods described herein improve the ability to determine a position of a sensor relative to a materials handling vehicle (e.g., a camera coupled to a materials handling vehicle) in a warehouse environment 10 by removing the requirement of prior information about the location of static features in the warehouse environment. As a result, calibration can occur before a site map 142 is generated, which frees up dependency on generating prior information and time associated with bringing a materials handling vehicle up to a functional state. Additionally, potential error associated with utilizing a map based calibration, such as using a SLAM map in one example, and manually seeding the materials handling vehicle within the map, may not be coupled with the camera's calibrated pose. Furthermore, information for a site map 142 may be generated in parallel with the calibration of the camera 110A or similar sensor 110 since each frame and related position coordinate may be compiled into a site map 142 for the warehouse environment 10. This information may further be used to update an existing site map 142 or to assist to establish a new site map 142 for a new warehouse environment 10, for example. SLAM is only one example of how a map may be generated for use by the systems and methods described herein and other map generation techniques are contemplated and within the scope of this disclosure. Another example of a map source includes surveyed maps.

For the purposes of describing and defining the present disclosure, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

It is also noted that recitations herein of "at least one" component, element, etc., should not be used to create an inference that the alternative use of the articles "a" or "an" should be limited to a single component, element, etc.

It is noted that recitations herein of a component of the present disclosure being "configured" in a particular way, to embody a particular property, or to function in a particular manner, are structural recitations, as opposed to recitations of intended use. More specifically, the references herein to the manner in which a component is "configured" denotes an existing physical condition of the component and, as such, is to be taken as a definite recitation of the structural characteristics of the component.

For the purposes of describing and defining the present invention, it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it is apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

While particular embodiments and aspects of the present disclosure have been illustrated and described herein, various other changes and modifications can be made without departing from the spirit and scope of the disclosure. Moreover, although various aspects have been described herein, such aspects need not be utilized in combination. Accordingly, it is therefore intended that the appended claims cover all such changes and modifications that are within the scope of the embodiments shown and described herein.

It should now be understood that embodiments disclosed herein includes systems, methods, and non-transitory computer-readable mediums for calibrating a materials handling vehicle are described. It should also be understood that these embodiments are merely exemplary and are not intended to limit the scope of this disclosure.

What is claimed is:

1. A materials handling vehicle comprising a sensor, a vehicle position processor, one or more vehicle dead reckoning components, and a drive mechanism configured to move the materials handling vehicle along an inventory transit surface, wherein:
   the sensor is configured to record one or more features of a warehouse; and
   the vehicle position processor is configured to generate sensor data from a recordation of one or more features, as recorded by the sensor, extract the one or more features from the sensor data, create a factor graph including a sensor extrinsics node (e0) comprising initial seed extrinsics associated with the sensor, generate, in the factor graph, an initial vehicle node (v0), an initial sensor frame node (c0), and an initial sensor feature node (f0), the initial sensor feature node (f0) comprising a selected one of the one or more extracted features associated with the initial sensor frame node (c0) and the initial vehicle node (v0) in an initial data association, navigate the materials handling vehicle using the drive mechanism along the inventory transit surface, generate, in the factor graph, a subsequent vehicle node (v1) based on an accumulated odometry amount from the one or more vehicle dead reckoning components, generate, in the factor graph, a subsequent sensor frame node (c1) associated with the sensor extrinsics node (e0), the subsequent vehicle node (v1), and one of the initial sensor feature node (f0) or a subsequent sensor feature node (f1) in a subsequent data association, optimize the factor graph to provide a calibration output of a calibration associated with the sensor based on the initial data association and the subsequent data association, generate an optimized calibration output when the calibration output is below a threshold minimum such that the calibration ends, and navigate the materials handling vehicle along the inventory transit surface based on the optimized calibration output associated with the sensor.

2. The materials handling vehicle of claim 1, wherein the vehicle position processor is further configured to:
generate, in the factor graph, the initial vehicle node (v0) as (i) a map-based initial vehicle node at a vehicle seed position with (ii) an associated vehicle prior factor and (iii) one or more mapped features from a site map as corresponding sensor feature nodes along with (iv) corresponding mapped feature prior factors when the vehicle seed position and a feature map comprising the one or more mapped features are provided.

3. The materials handling vehicle of claim 2, wherein the associated vehicle prior factor for the map-based initial vehicle node at the vehicle seed position comprises an error function with respect to an accuracy of the vehicle seed position of the materials handling vehicle with respect to the site map.

4. The materials handling vehicle of claim 1, wherein the vehicle position processor is further configured to:
generate, in the factor graph, the initial vehicle node (v0) as a mapless initial vehicle node at an origin when a vehicle seed position and a feature map are not provided.

5. The materials handling vehicle of claim 1, wherein the vehicle position processor is further configured to:
iteratively generate, in the factor graph, one or more subsequent sensor feature nodes and one or more further subsequent vehicle nodes based on the accumulated odometry amount from the one or more vehicle dead reckoning components between a preceding vehicle node and a directly subsequent vehicle node; and
iteratively generate, in the factor graph, one or more further subsequent sensor frame nodes associated with the sensor extrinsics node (e0), the associated directly subsequent vehicle node, and an associated sensor feature node of the one or more subsequent feature nodes in the subsequent data association.

6. The materials handling vehicle of claim 5, wherein the vehicle position processor is further configured to:
generate, in the factor graph, a vehicle between factor between the directly subsequent
vehicle node and the preceding vehicle node based on the accumulated odometry amount.

7. The materials handling vehicle of claim 1, wherein the vehicle position processor is further configured to:
select one feature of the one or more extracted features;
associate the one feature with an existing feature as a matched sensor feature node when the one feature and the existing feature match; and
generate, in the factor graph, a factor to link a generated sensor frame node with the matched feature node.

8. The materials handling vehicle of claim 7, wherein the generated sensor frame node comprises one of the initial sensor frame node (c0) or the subsequent sensor frame node (c1).

9. The materials handling vehicle of claim 7, wherein the matched sensor feature node comprises one of the initial sensor feature node (f0) or the subsequent sensor feature node (f1).

10. The materials handling vehicle of claim 1, wherein the vehicle position processor is further configured to:
select one feature of the one or more extracted features;
generate, in the factor graph, a new sensor feature node associated with the one feature when the one feature and an existing feature do not match;
generate, in the factor graph, a factor to link a generated sensor frame node with the new sensor feature node.

11. The materials handling vehicle of claim 10, wherein the new sensor feature node comprises one of the initial sensor feature node (f0) or the subsequent sensor feature node (f1).

12. The materials handling vehicle of claim 1, wherein the vehicle position processor is further configured to:
optimize the factor graph when no further features of the one or more extracted features remain to associate with existing features as corresponding matched sensor feature nodes or add to the factor graph as corresponding new sensor feature nodes.

13. The materials handling vehicle of claim 1, wherein the vehicle position processor is further configured to:
optimize the factor graph by generation of a constrained optimization problem based on one or more factors and one or more variables defined in the factor graph.

14. The materials handling vehicle of claim 13, wherein the one or more variables are representative of unknown random variables in the constrained optimization problem and comprise one or more nodes, the one or more nodes comprising one or more of the sensor extrinsics node (e0), the initial vehicle node (v0), the subsequent vehicle node (v1), the initial sensor frame node (c0), the subsequent sensor frame node (c1), the initial sensor feature node (f0), and the subsequent sensor feature node (f1).

15. The materials handling vehicle of claim 13, wherein the one or more factors are representative of probabilistic information with respect to select factors of the one or more factors and comprise a prior factor, a between factor, a reference frame factor, a projection factor, a bearing-range factor, or combinations thereof.

16. The materials handling vehicle of claim 13, wherein the constrained optimization problem is constructed using one or more smoothing and mapping (SAM) libraries and optimizers.

17. The materials handling vehicle of claim 13, wherein the one or more features comprise one or more overhead lights of the warehouse, and the constrained optimization problem is constructed using an image recognition algorithm, a data association algorithm, a modeling technique, or combinations thereof.

18. The materials handling vehicle of claim 1, wherein the vehicle position processor is further configured to:
terminate the optimization upon a determination of an intrinsic factor graph status over a period of time as acceptable based on a predetermined threshold.

19. The materials handling vehicle of claim 1, wherein:
the sensor is a camera, a laser-based sensor, or combinations thereof;
the camera is configured to capture the one or more features of the warehouse;
the laser-based sensor is configured to detect the one or more features of the warehouse; and
the vehicle position processor is further configured to generate the sensor data from the recordation of the one or more features, as captured by the camera, detected by the laser-based sensor, or combinations thereof.

20. A method of operating a materials handling vehicle, the materials handling vehicle comprising a sensor, a vehicle position processor, one or more vehicle dead reckoning components, and a drive mechanism configured to move the materials handling vehicle along an inventory transit surface, wherein the sensor is configured to record one or more features of a warehouse, the method comprising, via the vehicle position processor:

generating sensor data from a recordation of one or more features, as recorded by the sensor;
extracting the one or more features from the sensor data;
creating a factor graph including a sensor extrinsics node (e0) comprising initial seed extrinsics associated with the sensor;
generating, in the factor graph, an initial vehicle node (v0), an initial sensor frame node (c0), and an initial sensor feature node (f0), the initial sensor feature node (f0) comprising a selected one of the one or more extracted features associated with the initial sensor frame node (c0) and the initial vehicle node (v0) in an initial data association;
navigating the materials handling vehicle using the drive mechanism along the inventory transit surface;
generating, in the factor graph, a subsequent vehicle node (v1) based on an accumulated odometry amount from the one or more vehicle dead reckoning components;
generating, in the factor graph, a subsequent sensor frame node (c1) associated with the sensor extrinsics node (e0), the subsequent vehicle node (v1), and one of the initial sensor feature node (f0) or a subsequent sensor feature node (f1) in a subsequent data association;
optimizing the factor graph to provide a calibration output of a calibration associated with the sensor based on the initial data association and the subsequent data association;
generating an optimized calibration output when the calibration output is below a threshold minimum such that the calibration ends; and
navigating the materials handling vehicle along the inventory transit surface based on the optimized calibration output associated with the sensor.

* * * * *